US012471819B2

(12) United States Patent
Karma et al.

(10) Patent No.: US 12,471,819 B2
(45) Date of Patent: Nov. 18, 2025

(54) TECHNIQUES FOR PROVIDING PHYSIOLOGICAL STATE-RELATED INSIGHTS ASSOCIATED WITH A USER

(71) Applicant: OURA HEALTH OY, Oulu (FI)

(72) Inventors: Heikki Karma, Oulu (FI); Kirsi Maansaari, Oulu (FI); Heli Koskimäki, Oulu (FI); Tero Vallius, Oulu (FI)

(73) Assignee: OURA HEALTH OY, Oulu (FI)

( * ) Notice: Subject to any disclaimer, the term of this patent is extended or adjusted under 35 U.S.C. 154(b) by 31 days.

(21) Appl. No.: 18/337,073

(22) Filed: Jun. 19, 2023

(65) Prior Publication Data

US 2024/0415434 A1 Dec. 19, 2024

(51) Int. Cl.
*A61B 5/18* (2006.01)
*A61B 5/00* (2006.01)
(Continued)

(52) U.S. Cl.
CPC .............. *A61B 5/18* (2013.01); *A61B 5/1112* (2013.01); *A61B 5/6801* (2013.01); *A61B 5/746* (2013.01);
(Continued)

(58) Field of Classification Search
CPC ....... A61B 5/18; A61B 5/1112; A61B 5/6801; A61B 5/746; A61B 5/7435; A61B 2503/22; B60Q 9/00; G08B 21/0453
See application file for complete search history.

(56) References Cited

U.S. PATENT DOCUMENTS 9,569,798 B2 * 2/2017 Biemer ............... H04W 68/00
9,792,801 B2 10/2017 Savolainen et al.
(Continued)

OTHER PUBLICATIONS

European Patent Office, International Search Report, Application No. PCT/FI2024/050324, Mailed Oct. 14, 2024, 4 pages.

*Primary Examiner* — Nay Tun
(74) *Attorney, Agent, or Firm* — Ziegler IP Law Group, LLC

(57) ABSTRACT

Methods, systems, and devices for providing physiological state-related insights associated with a user are described. A method includes receiving physiological data associated with the user from at least one wearable device, the physiological baseline providing reference user alertness data. The method further includes obtaining a physiological baseline associated with the user based at least in part on the baseline physiological data associated with the user, the physiological baseline providing reference user alertness data. The method further includes receiving additional physiological data associated with the user from the at least one wearable device. The method further includes obtaining current user alertness data based at least in part on the additional physiological data associated with the user. The method further includes identifying a trigger condition for providing a physiological state-related insight associated with the user relating to a traveling event involving at least one vehicle based at least in part on a comparison between the current user alertness data and the reference user alertness data. The method further includes causing a user device to provide the physiological state-related insight associated with the user.

14 Claims, 7 Drawing Sheets

(51) Int. Cl.
*A61B 5/11* (2006.01)
*B60Q 9/00* (2006.01)
*G08B 21/04* (2006.01)

(52) U.S. Cl.
CPC ............ *B60Q 9/00* (2013.01); *G08B 21/0453* (2013.01); *A61B 5/7435* (2013.01); *A61B 2503/22* (2013.01); *A61B 2562/0219* (2013.01)

(56) References Cited

U.S. PATENT DOCUMENTS

| | | | | |
|---|---|---|---|---|
| 10,235,859 B1* | 3/2019 | Hiles | ............ | A61B 5/18 |
| 11,180,158 B1* | 11/2021 | Lyle | ............ | B60W 40/08 |
| 2007/0038351 A1* | 2/2007 | Larschan | ............ | G07C 5/008 |
| | | | | 701/33.4 |
| 2012/0072097 A1* | 3/2012 | Ohta | ............ | G08G 1/167 |
| | | | | 701/1 |
| 2015/0192426 A1* | 7/2015 | Foster | ............ | G01C 21/3664 |
| | | | | 709/228 |
| 2015/0351681 A1* | 12/2015 | Lee | ............ | G08B 21/06 |
| | | | | 600/595 |
| 2016/0039424 A1* | 2/2016 | Hong | ............ | G08B 25/08 |
| | | | | 340/576 |
| 2016/0071393 A1 | 3/2016 | Kaplan et al. | | |
| 2017/0021764 A1* | 1/2017 | Adams | ............ | G06Q 40/08 |
| 2017/0053461 A1* | 2/2017 | Pal | ............ | G08G 1/012 |
| 2017/0150930 A1* | 6/2017 | Shikii | ............ | A61B 5/026 |
| 2017/0210290 A1* | 7/2017 | Cordova | ............ | B60Q 9/00 |
| 2018/0126901 A1* | 5/2018 | Levkova | ............ | B60W 40/09 |
| 2019/0083022 A1* | 3/2019 | Huang | ............ | A61B 5/024 |
| 2019/0223773 A1* | 7/2019 | Galm | ............ | A61B 5/165 |
| 2019/0357834 A1 | 11/2019 | Aarts et al. | | |
| 2020/0286310 A1* | 9/2020 | Carver | ............ | G07C 5/0816 |
| 2021/0023990 A1* | 1/2021 | Lynar | ............ | B60Q 9/00 |
| 2022/0048432 A1* | 2/2022 | Switalski | ............ | G08G 1/205 |
| 2022/0297644 A1* | 9/2022 | Rho | ............ | B60T 7/14 |

* cited by examiner

TECHNIQUES FOR PROVIDING PHYSIOLOGICAL STATE-RELATED INSIGHTS ASSOCIATED WITH A USER

FIELD OF TECHNOLOGY

The following relates to wearable devices and data processing, including techniques for providing physiological state-related insights associated with a user.

BACKGROUND

Some wearable devices may be configured to collect data from users associated with exercise, sleep, and the like. The collected data may provide further information about the alertness of a user. For example, the user may have slept poorly for the last few days, and this may have an effect on the alertness of the user and thus also on actions that the user will perform.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

According to a first aspect, a method for providing physiological state-related insights associated with a user comprises receiving baseline physiological data associated with a user from at least one wearable device; obtaining a physiological baseline associated with the user based at least in part on the baseline physiological data associated with the user, the physiological baseline providing reference user alertness data; receiving additional physiological data associated with the user from the at least one wearable device; obtaining current user alertness data based at least in part on the additional physiological data associated with the user; identifying a trigger condition for providing a physiological state-related insight associated with the user relating to a traveling event involving at least one vehicle based at least in part on a comparison between the current user alertness data and the reference user alertness data; and causing a user device to provide the physiological state-related insight associated with the user.

In an example embodiment of the first aspect, identifying the trigger condition further comprises identifying the trigger condition when the current user alertness data differs from the reference user alertness data by a predetermined threshold amount.

In an example embodiment of the first aspect, the traveling event is a future traveling event.

In an example embodiment of the first aspect, the traveling event is a current traveling event.

In an example embodiment of the first aspect, the physiological data comprises acceleration sensor data, and the method further comprises identifying that the user is driving the at least one vehicle based at least in part on a comparison between the acceleration sensor data and reference acceleration sensor data; and detecting the traveling event based at least in part on the comparison.

In an example embodiment of the first aspect, the method further comprises establishing an active local communication link between the user device and the at least one vehicle; and detecting the traveling event based at least in part on the existence of the active local communication link between the user device and the at least one vehicle.

In an example embodiment of the first aspect, the method further comprises receiving satellite positioning data from the user device; and detecting the traveling event based at least in part on the satellite positioning data from the user device.

In an example embodiment of the first aspect, the method further comprises transmitting, in response to detecting the traveling event, to the at least one wearable device an instruction to apply a predefined rate for transmitting the physiological data.

In an example embodiment of the first aspect, causing the user device to provide the physiological state-related insight associated with the user comprises transmitting the physiological state-related insight to the at least one vehicle via the active local communication link between the user device and the at least one vehicle.

In an example embodiment of the first aspect, causing the user device to provide the physiological state-related insight associated with the user comprises causing a graphical user interface of the user device to display the physiological state-related insight.

In an example embodiment of the first aspect, causing the user device to provide the physiological state-related insight associated with the user comprises causing the user device to provide at least one of an auditory alert, a haptic alert and a visual alert associated with the physiological state-related insight.

In an example embodiment of the first aspect, the method further comprises receiving vehicle data associated with the user from the at least one vehicle, wherein the vehicle data associated with the user comprises user behavior data collected during the traveling event, wherein identifying the trigger condition comprises identifying the trigger condition based at least in part on the vehicle data associated with the user.

In an example embodiment of the first aspect, the method further comprises receiving weather data associated with the traveling event; determining, based on the weather data associated with the traveling event, that the weather data associated with the traveling event has an effect on the traveling event; and wherein identifying the trigger condition comprises identifying the trigger condition based at least in part on the weather data.

In an example embodiment of the first aspect, the method further comprises receiving calendar data associated with the traveling event; determining, based on calendar data associated with the traveling event, that the traveling event is a future traveling event; and wherein identifying the trigger condition comprises identifying the trigger condition based at least in part on the determination.

In an example embodiment of the first aspect, the method further comprises receiving satellite positioning data associated with the traveling event from the user device; determining, based on the satellite positioning data associated with the traveling event, that the traveling event relates to an unexperienced route for the user; and wherein identifying the trigger condition comprises identifying the trigger condition based at least in part on the determination.

In an example embodiment of the first aspect, the method further comprises receiving route schedule data associated with the traveling event; wherein identifying the trigger condition comprises identifying the trigger condition based at least in part on the route schedule data.

According to a second aspect, an apparatus for providing physiological state-related insights associated with a user comprises a processor; a memory coupled with the processor; and instructions stored in the memory and executable by the processor to cause the apparatus to receive baseline physiological data associated with a user from at least one wearable device; obtain a physiological baseline associated with the user based at least in part on the baseline physiological data associated with the user, the physiological baseline providing reference user alertness data; receive additional physiological data associated with the user from the at least one wearable device; obtain current user alertness data based at least in part on the additional physiological data associated with the user; identify a trigger condition for providing a physiological state-related insight associated with the user relating to a traveling event involving at least one vehicle based at least in part on a comparison between the current user alertness data and the reference user alertness data; and cause a user device to provide the physiological state-related insight associated with the user.

In an example embodiment of the second aspect, when identifying the trigger condition, the instructions are further executable by the processor to cause the apparatus to identify the trigger condition when the current user alertness data differs from the reference user alertness data by a predetermined threshold amount.

In an example embodiment of the second aspect, the traveling event is a future traveling event.

In an example embodiment of the second aspect, the traveling event is a current traveling event.

In an example embodiment of the second aspect, the additional physiological data comprises acceleration sensor data, and the instructions are further executable by the processor to cause the apparatus to identify that the user is driving the at least one vehicle based at least in part on a comparison between the acceleration sensor data and reference acceleration sensor data; and detect the traveling event based at least in part on the comparison.

In an example embodiment of the second aspect, the instructions are further executable by the processor to cause the apparatus to establish an active local communication link between the user device and the at least one vehicle, and detect the traveling event based at least in part on the existence of the active local communication link between the user device and the at least one vehicle.

In an example embodiment of the second aspect, the instructions are further executable by the processor to cause the apparatus to receive satellite positioning data from the user device, and detect the traveling event based at least in part on the satellite positioning data from the user device.

In an example embodiment of the second aspect, the instructions are further executable by the processor to cause the apparatus to transmit, in response to detecting the traveling event, to the at least one wearable device an instruction to apply a predefined rate for transmitting the physiological data.

In an example embodiment of the second aspect, when causing a user device to provide a physiological state-related insight associated with the user, the instructions are further executable by the processor to cause the apparatus to transmit the physiological state-related insight to the at least one vehicle via the active local communication link between the user device and the at least one vehicle.

In an example embodiment of the second aspect, when causing a user device to provide a physiological state-related insight associated with the user, the instructions are further executable by the processor to cause the apparatus to cause a graphical user interface of the user device to display the physiological state-related insight.

In an example embodiment of the second aspect, when causing a user device to provide a physiological state-related insight associated with the user, the instructions are further executable by the processor to cause the apparatus to cause the user device to provide at least one of an audible alert, a haptic alert and a visual alert associated with the physiological state-related insight.

In an example embodiment of the second aspect, the instructions are further executable by the processor to cause the apparatus to receive vehicle data associated with the user from the at least one vehicle, wherein the vehicle data associated with the user comprises user behavior data collected during the traveling event, wherein identifying the trigger condition comprises identifying the trigger condition based at least in part on the vehicle data associated with the user.

In an example embodiment of the second aspect, the instructions are further executable by the processor to cause the apparatus to receive weather data associated with the traveling event; determining, based on the weather data associated with the traveling event, that the weather data associated with the traveling event has an effect on the traveling event; and wherein identifying a trigger condition for providing a physiological state-related insight associated with the user relating to the traveling event comprises identifying the trigger condition based at least in part on the weather data.

In an example embodiment of the second aspect, the instructions are further executable by the processor to cause the apparatus to receive calendar data associated with the traveling event; determine, based on calendar data associated with the traveling event, that the traveling event is a future traveling event; and wherein identifying a trigger condition for providing a physiological state-related insight associated with the user relating to the traveling event comprises identifying the trigger condition based at least in part on the determination.

In an example embodiment of the second aspect, the instructions are further executable by the processor to cause the apparatus to receive satellite positioning data associated with the traveling event from the user device; determine, based on the satellite positioning data associated with the traveling event, that the traveling event relates to an unexperienced route for the user; and wherein identifying a trigger condition for providing a physiological state-related insight associated with the user relating to the traveling event comprises identifying the trigger condition based at least in part on the determination.

In an example embodiment of the second aspect, the instructions are further executable by the processor to cause the apparatus to receive route schedule data associated with the traveling event; wherein identifying a trigger condition for providing a physiological state-related insight associated with the user relating to the traveling event comprises identifying the trigger condition based at least in part on the route schedule data.

According to a third aspect, a non-transitory computer-readable medium stores code, the code comprising instructions executable by a processor to receive baseline physiological data associated with a user from at least one wearable device; obtain a physiological baseline associated with the user based at least in part on the baseline physiological data associated with the user, the physiological baseline providing reference user alertness data; receive additional physiological data associated with the user from the at least one wearable device; obtain current user alertness data based at least in part on the additional physiological data associated with the user; identify a trigger condition for providing a physiological state-related insight associated with the user relating to a traveling event involving at least one vehicle based at least in part on a comparison between the current user alertness data and the reference user alertness data; and cause a user device to provide the physiological state-related insight associated with the user.

According to a fourth aspect, an apparatus for providing physiological state-related insights associated with a user comprises means for: receiving baseline physiological data associated with a user from at least one wearable device; obtaining a physiological baseline associated with the user based at least in part on the baseline physiological data associated with the user, the physiological baseline providing reference user alertness data; receiving additional physiological data associated with the user from the at least one wearable device; obtaining current user alertness data based at least in part on the additional physiological data associated with the user; identifying a trigger condition for providing a physiological state-related insight associated with the user relating to a traveling event involving at least one vehicle based at least in part on a comparison between the current user alertness data and the reference user alertness data; and causing a user device to provide the physiological state-related insight associated with the user.

DETAILED DESCRIPTION

Figure 1:
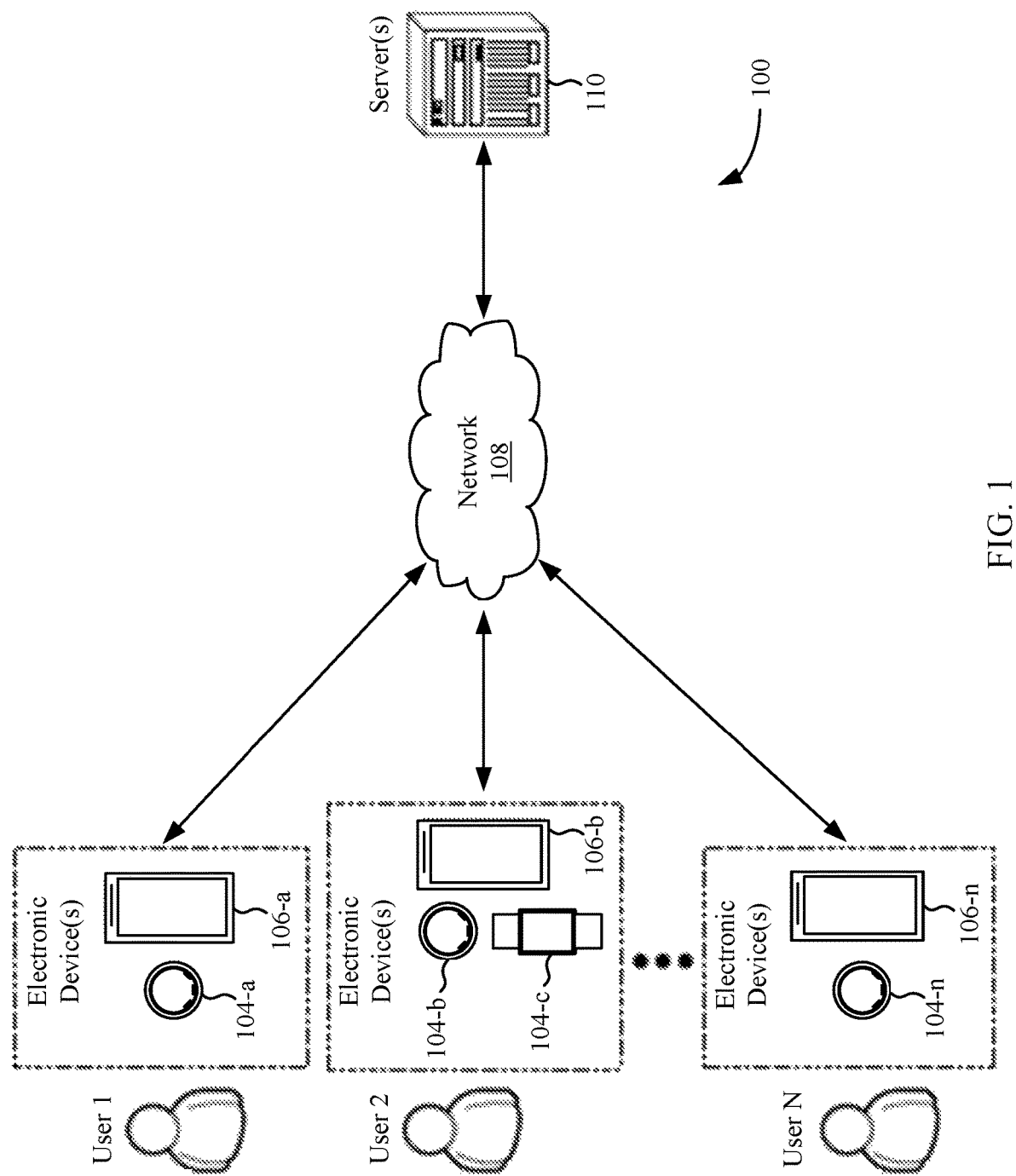
FIG. 1 illustrates an example of a system that supports techniques for providing physiological state-related insights associated with a user, in accordance with aspects of the present disclosure.

Wearable devices, such as wearable ring devices, may be used to collect, monitor, and track physiological data associated with a user based on sensor measurements performed by the wearable device. Examples of physiological data that may be collected by a wearable device may include temperature data, heart rate data, photoplethysmography (PPG) data, blood-oxygen saturation data, and the like. The physiological data collected, monitored, and tracked via the wearable device may be used to gain health insights about the user, such as the user's sleeping patterns, activity patterns, and the like. However, the health insights provided by many conventional wearable devices may not be related to a future or current traveling event involving a vehicle, do not enable the users to take actions with respect to the health insights relating to the traveling event and do not enable to share the health insights, for example, with the vehicle so that the vehicle can take into account the health insights when monitoring the user during the traveling event.

Accordingly, aspects of the present disclosure are directed to techniques that enable a user device to provide actionable guidance or insights relating to a traveling event involving a vehicle to enable users to receive guidance either proactively or reactively.

For example, a wearable device may acquire baseline physiological data from the user throughout the day, such as heart rate data, temperature data, and the like. The baseline physiological data comprising measured physiological parameters may include any physiological parameters known in the art, including daytime heart rate data (e.g., heart rate while the user is awake), nighttime heart rate data (e.g., heart rate while the user is asleep), restorative time (e.g., time the user spends in a relaxed state), temperature (e.g., body temperature, skin temperature), respiration rate, blood oxygen saturation, activity/movement, or any combination thereof. The baseline physiological data may be used to obtain a physiological baseline associated with a user, the physiological baseline providing reference user alertness data. The reference user alertness data may be derived from the baseline physiological data, i.e. from the actual measurements measured by the wearable device, for example, a heart rate, skin temperature, blood oxygen saturation, activity/movement etc.

The user device may receive additional physiological data associated with the user from at least one wearable device. For example, the additional physiological data associated with the user may relate, for example, to the last 24, 48 or 72 hour time period or any other applicable time period.

The user device may obtain current user alertness data based at least in part on the additional physiological data associated with the user. The current user alertness data may be derived from the additional physiological data, i.e. from the actual measurements measured by the wearable device, for example, a heart rate, skin temperature, blood oxygen saturation, activity/movement etc. This information may then be made use of when the user starts a traveling event or is about to start the traveling event in the (near) future.

The user device may identify a trigger condition for providing a physiological state-related insight associated with the user relating to the traveling event based at least in part on a comparison between the current user alertness data and the reference user alertness data. For example, the current user alertness data may indicate that the user has slept poorly for the last three nights. This may cause the current user alertness data to fall below the reference user alertness data, and trigger the physiological state-related insight associated with the user relating to the traveling event.

The user device may be caused to provide the physiological state-related insight associated with the user. In one example, the user device itself may provide the physiological state-related insight associated with the user, for example, using a graphical user interface of a user device.

For example, if the traveling event is a future traveling event, the user device may instruct the user to eat and/or sleep in properly before the traveling event. In another example, the user device may transmit the physiological state-related insight associated with the user, for example, to the vehicle, for example, a car, and the car may take the physiological state-related insight into account when monitoring the user. Thus the vehicle may be provided with additional information about the user's current alertness data, which may have an effect on the user's performance while driving the car, and a driver monitoring system of the vehicle is able to take this information into account when monitoring the user.

For example, the user's current physiological status, i.e. user alertness data, may be different (i.e. lower or weaker) from the user's normal alertness data due to many reasons, for example, a lack of sleep, too much exercise, irregular eating, etc. When the user then starts a traveling event or plans to start the traveling event soon, the user's current alertness data may not be optimal for the traveling event. The solution illustrated herein enables to take into account the user's current alertness data during a current traveling event or before a future traveling event, and provide the physiological state-related insight based on the current alertness data.

Some aspects of the present disclosure are directed to techniques for providing the physiological state-related insight associated with the user during a current traveling event. For example, as the user's alertness data prior to the traveling event is known to the user device, the user device may instruct the user to take breaks and/or eat at certain points during the traveling event. Some aspects of the present disclosure are directed to techniques for offering the physiological state-related insight associated with the user to the vehicle so that the vehicle can determine an action based at least in part on the physiological state-related insight. This enables a solution in which in addition to driver monitoring data provided by the vehicle itself the vehicle receives additional information about the user's alertness data from the user device and may take this information into account. Thus, a solution for providing reactive actions (for example, instructions or warning messages) to the user is enabled by the present disclosure.

Some aspects of the present disclosure are directed to techniques for providing the physiological state-related insight associated with the user about a future traveling event. This enables a solution for providing the physiological state-related insight even before the traveling event has started, for example, providing instructions or warning messages to the user relating to the future traveling event. In other words, this enables a solution for providing proactive actions, when the user is considered to be too tired (for example, "take a nap before starting the traveling event" or "drink a cup of coffee before starting the traveling event" etc.).

Some aspects of the present disclosure are directed to techniques for receiving vehicle data associated with the user from the vehicle. This data can then be used when identifying the trigger condition for providing the physiological state-related insight associated with the user. For example, the vehicle may collect various types of sensor data showing how the user behaves while driving a car. For example, the car may detect how the user applies the brakes of the car, how long the user has been driving, collect lane assist data etc. This enables a solution that in addition to using the physiological data collected by the at least one wearable device, also the vehicle data may have an effect when identifying the trigger condition for providing the physiological state-related insight associated with the user.

Some aspects of the present disclosure are directed to techniques for providing the physiological state-related insight via a graphical user interface of the user device. Additionally or alternatively, the physiological state-related insight may be provided via an auditory alert, a haptic alert and/or a visual alert (for example, using lights). For example, the auditory alert or the visual alert may instruct the user to take a break during a drive event. In some embodiments, the haptic alert and/or visual alert may be used to get the user's attention, for example, when the user device is in the user's pocket or when the user is not otherwise paying attention to the user device. This enables a solution in which the user device can be used as means for providing the physiological state-related insight to the user.

Aspects of the disclosure are initially described in the context of systems supporting physiological data collection from users via wearable devices. Aspects of the disclosure are further illustrated by and described with reference to apparatus diagrams, system diagrams, and flowcharts that relate to techniques for providing physiological state-related insights associated with a user.

FIG. 1 illustrates an example of a system 100 that supports techniques for providing physiological state-related insights associated with a user, in accordance with aspects of the present disclosure. The system 100 includes a plurality of electronic devices (e.g., wearable devices 104, user devices 106) that may be worn and/or operated by one or more users 102. The system 100 further includes a network 108 and one or more servers 110.

The electronic devices may include any electronic devices known in the art, including wearable devices 104 (e.g., ring wearable devices, watch wearable devices, etc.), user devices 106 (e.g., smartphones, laptops, tablets). The electronic devices associated with the respective users 102 may include one or more of the following functionalities: 1) measuring physiological data, 2) storing the measured data, 3) processing the data, 4) providing outputs (e.g., via GUIs, auditory signals, haptic signals, visual signals) to a user 102 based on the processed data, and 5) communicating data with one another and/or other computing devices. Different electronic devices may perform one or more of the functionalities.

Example wearable devices 104 may include wearable computing devices, such as a ring computing device (hereinafter "ring") configured to be worn on a user's 102 finger, a wrist computing device (e.g., a smart watch, fitness band, or bracelet) configured to be worn on a user's 102 wrist, and/or a head mounted computing device (e.g., glasses/goggles). Wearable devices 104 may also include bands, straps (e.g., flexible or inflexible bands or straps), stick-on sensors, and the like, that may be positioned in other locations, such as bands around the head (e.g., a forehead headband), arm (e.g., a forearm band and/or bicep band), and/or leg (e.g., a thigh or calf band), behind the ear, under the armpit, and the like. Wearable devices 104 may also be attached to, or included in, articles of clothing. For example, wearable devices 104 may be included in pockets and/or pouches on clothing. As another example, wearable device 104 may be clipped and/or pinned to clothing, or may otherwise be maintained within the vicinity of the user 102. Example articles of clothing may include, but are not limited to, hats, shirts, gloves, pants, socks, outerwear (e.g., jackets), and undergarments. In some implementations, wearable devices 104 may be included with other types of devices such as training/sporting devices that are used during physical activity. For example, wearable devices 104 may be attached to, or included in, a bicycle, skis, a tennis racket, a golf club, and/or training weights.

Much of the present disclosure may be described in the context of a ring wearable device 104. Accordingly, the terms "ring 104," "wearable device 104," and like terms, may be used interchangeably, unless noted otherwise herein. However, the use of the term "ring 104" is not to be regarded as limiting, as it is contemplated herein that aspects of the present disclosure may be performed using other wearable devices (e.g., watch wearable devices, necklace wearable device, bracelet wearable devices, earring wearable devices, anklet wearable devices, and the like).

In some aspects, user devices 106 may include handheld mobile computing devices, such as smartphones and tablet computing devices. User devices 106 may also include personal computers, such as laptop and desktop computing devices. Other example user devices 106 may include server computing devices that may communicate with other electronic devices (e.g., via the Internet). In some implementations, computing devices may include medical devices, such as external wearable computing devices (e.g., Holter monitors). Medical devices may also include implantable medical devices, such as pacemakers and cardioverter defibrillators. Other example user devices 106 may include home computing devices, such as internet of things (IoT) devices (e.g., IoT devices), smart televisions, smart speakers, smart displays (e.g., video call displays), hubs (e.g., wireless communication hubs), security systems, smart appliances (e.g., thermostats and refrigerators), and fitness equipment.

Some electronic devices (e.g., wearable devices 104, user devices 106) may measure physiological parameters of respective users 102, such as photoplethysmography waveforms, continuous skin temperature, a pulse waveform, respiration rate, heart rate, heart rate variability (HRV), actigraphy, galvanic skin response, pulse oximetry, and/or other physiological parameters. Some electronic devices that measure physiological parameters may also perform some/all of the calculations described herein. Some electronic devices may not measure physiological parameters, but may perform some/all of the calculations described herein. For example, a ring (e.g., wearable device 104), mobile device application, or a server computing device may process received physiological data that was measured by other devices.

In some implementations, a user 102 may operate, or may be associated with, multiple electronic devices, some of which may measure physiological parameters and some of which may process the measured physiological parameters. In some implementations, a user 102 may have a ring (e.g., wearable device 104) that measures physiological parameters. The user 102 may also have, or be associated with, a user device 106 (e.g., mobile device, smartphone), where the wearable device 104 and the user device 106 are communicatively coupled to one another. In some cases, the user device 106 may receive data from the wearable device 104 and perform some/all of the calculations described herein. In some implementations, the user device 106 may also measure physiological parameters described herein, such as motion/activity parameters.

For example, as illustrated in FIG. 1, a first user 102-a (User 1) may operate, or may be associated with, a wearable device 104-a (e.g., ring 104-a) and a user device 106-a that may operate as described herein. In this example, the user device 106-a associated with user 102-a may process/store physiological parameters measured by the ring 104-a. Comparatively, a second user 102-b (User 2) may be associated with a ring 104-b, a watch wearable device 104-c (e.g., watch 104-c), and a user device 106-b, where the user device 106-b associated with user 102-b may process/store physiological parameters measured by the ring 104-b and/or the watch 104-c. Moreover, an nth user 102-n (User N) may be associated with an arrangement of electronic devices described herein (e.g., ring 104-n, user device 106-n). In some aspects, wearable devices 104 (e.g., rings 104, watches 104) and other electronic devices may be communicatively coupled to the user devices 106 of the respective users 102 via Bluetooth, Wi-Fi, and other wireless protocols.

In some implementations, the rings 104 (e.g., wearable devices 104) of the system 100 may be configured to collect physiological data from the respective users 102 based on arterial blood flow within the user's finger. In particular, a ring 104 may utilize one or more light-emitting components, such as LEDs (e.g., red LEDs, green LEDs) that emit light on the palm-side of a user's finger to collect physiological data based on arterial blood flow within the user's finger. In general, the terms light-emitting components, light-emitting elements, and like terms, may include, but are not limited to, LEDs, micro LEDs, mini LEDs, laser diodes (LDs), and the like.

In some cases, the system 100 may be configured to collect physiological data from the respective users 102 based on blood flow diffused into a microvascular bed of skin with capillaries and arterioles. For example, the system 100 may collect PPG data based on a measured amount of blood diffused into the microvascular system of capillaries and arterioles. In some implementations, the ring 104 may acquire the physiological data using a combination of both green and red LEDs. The physiological data may include any physiological data known in the art including, but not limited to, temperature data, accelerometer data (e.g., movement/motion data), heart rate data, HRV data, blood oxygen level data, or any combination thereof.

The use of both green and red LEDs may provide several advantages over other solutions, as red and green LEDs have been found to have their own distinct advantages when acquiring physiological data under different conditions (e.g., light/dark, active/inactive) and via different parts of the body, and the like. For example, green LEDs have been found to exhibit better performance during exercise. Moreover, using multiple LEDs (e.g., green and red LEDs) distributed around the ring 104 has been found to exhibit superior performance as compared to wearable devices that utilize LEDs that are positioned close to one another, such as within a watch wearable device. Furthermore, the blood vessels in the finger (e.g., arteries, capillaries) are more accessible via LEDs as compared to blood vessels in the wrist. In particular, arteries in the wrist are positioned on the bottom of the wrist (e.g., palm-side of the wrist), meaning only capillaries are accessible on the top of the wrist (e.g., back of hand side of the wrist), where wearable watch devices and similar devices are typically worn. As such, utilizing LEDs and other sensors within a ring 104 has been found to exhibit superior performance as compared to wearable devices worn on the wrist, as the ring 104 may have greater access to arteries (as compared to capillaries), thereby resulting in stronger signals and more valuable physiological data.

The electronic devices of the system 100 (e.g., user devices 106, wearable devices 104) may be communicatively coupled to one or more servers 110 via wired or wireless communication protocols. For example, as shown in FIG. 1, the electronic devices (e.g., user devices 106) may be communicatively coupled to one or more servers 110 via a network 108. The network 108 may implement transfer control protocol and internet protocol (TCP/IP), such as the Internet, or may implement other network 108 protocols. Network connections between the network 108 and the respective electronic devices may facilitate transport of data via email, web, text messages, mail, or any other appropriate form of interaction within a computer network 108. For example, in some implementations, the ring 104-a associated with the first user 102-a may be communicatively coupled to the user device 106-a, where the user device 106-a is communicatively coupled to the servers 110 via the network 108. In additional or alternative cases, wearable devices 104 (e.g., rings 104, watches 104) may be directly communicatively coupled to the network 108.

The system 100 may offer an on-demand database service between the user devices 106 and the one or more servers 110. In some cases, the servers 110 may receive data from the user devices 106 via the network 108, and may store and analyze the data. Similarly, the servers 110 may provide data to the user devices 106 via the network 108. In some cases, the servers 110 may be located at one or more data centers. The servers 110 may be used for data storage, management, and processing. In some implementations, the servers 110 may provide a web-based interface to the user device 106 via web browsers.

In some aspects, the system 100 may detect periods of time that a user 102 is asleep, and classify periods of time that the user 102 is asleep into one or more sleep stages (e.g., sleep stage classification). For example, as shown in FIG. 1, User 102-a may be associated with a wearable device 104-a (e.g., ring 104-a) and a user device 106-a. In this example, the ring 104-a may collect physiological data associated with the user 102-a, including temperature, heart rate, HRV, respiratory rate, and the like. In some aspects, data collected by the ring 104-a may be input to a machine learning classifier, where the machine learning classifier is configured to determine periods of time that the user 102-a is (or was) asleep. Moreover, the machine learning classifier may be configured to classify periods of time into different sleep stages, including an awake sleep stage, a rapid eye movement (REM) sleep stage, a light sleep stage (non-REM (NREM)), and a deep sleep stage (NREM). In some aspects, the classified sleep stages may be displayed to the user 102-a via a GUI of the user device 106-a. Sleep stage classification may be used to provide feedback to a user 102-a regarding the user's sleeping patterns, such as recommended bedtimes, recommended wake-up times, and the like. Moreover, in some implementations, sleep stage classification techniques described herein may be used to calculate scores for the respective user, such as Sleep Scores, Readiness Scores, and the like. Further, the system 100 may detect whether the user 102-a (User 1) is beginning to transition into a sleep state (e.g., a deep sleep state) of a set of sleep states (e.g., an awake sleep state, a REM sleep state, an NREM sleep state) based at least in part on the collected physiological data. Any of the components of the system 100, including the wearable device 104-a, the user device 106-a associated with the user 102-a (User 1), the one or more servers 110, or any combination thereof, may detect whether the user 102-a (User 1) is beginning to transition into a sleep state (e.g., a deep sleep state) of a set of sleep states based at least in part on the collected physiological data.

In some aspects, the system 100 may utilize circadian rhythm-derived features to further improve physiological data collection, data processing procedures, and other techniques described herein. The term circadian rhythm may refer to a natural, internal process that regulates an individual's sleep-wake cycle, that repeats approximately every 24 hours. In this regard, techniques described herein may utilize circadian rhythm adjustment models to improve physiological data collection, analysis, and data processing. For example, a circadian rhythm adjustment model may be input into a machine learning classifier along with physiological data collected from the user 102-a via the wearable device 104-a. In this example, the circadian rhythm adjustment model may be configured to "weight," or adjust, physiological data collected throughout a user's natural, approximately 24-hour circadian rhythm. In some implementations, the system may initially start with a "baseline" circadian rhythm adjustment model, and may modify the baseline model using physiological data collected from each user 102 to generate tailored, individualized circadian rhythm adjustment models that are specific to each respective user 102.

In some aspects, the system 100 may utilize other biological rhythms to further improve physiological data collection, analysis, and processing by phase of these other rhythms. For example, if a weekly rhythm is detected within an individual's baseline data, then the model may be configured to adjust "weights" of data by day of the week. Biological rhythms that may require adjustment to the model by this method include: 1) ultradian (faster than a day rhythms, including sleep cycles in a sleep state, and oscillations from less than an hour to several hours periodicity in the measured physiological variables during wake state; 2) circadian rhythms; 3) non-endogenous daily rhythms shown to be imposed on top of circadian rhythms, as in work schedules; 4) weekly rhythms, or other artificial time periodicities exogenously imposed (e.g., in a hypothetical culture with 12 day "weeks", 12 day rhythms could be used); 5) multi-day ovarian rhythms in women and spermatogenesis rhythms in men; 6) lunar rhythms (relevant for individuals living with low or no artificial lights); and 7) seasonal rhythms.

The biological rhythms are not always stationary rhythms. For example, many women experience variability in ovarian cycle length across cycles, and ultradian rhythms are not expected to occur at exactly the same time or periodicity across days even within a user. As such, signal processing techniques sufficient to quantify the frequency composition while preserving temporal resolution of these rhythms in physiological data may be used to improve detection of these rhythms, to assign phase of each rhythm to each moment in time measured, and to thereby modify adjustment models and comparisons of time intervals. The biological rhythm-adjustment models and parameters can be added in linear or non-linear combinations as appropriate to more accurately capture the dynamic physiological baselines of an individual or group of individuals.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
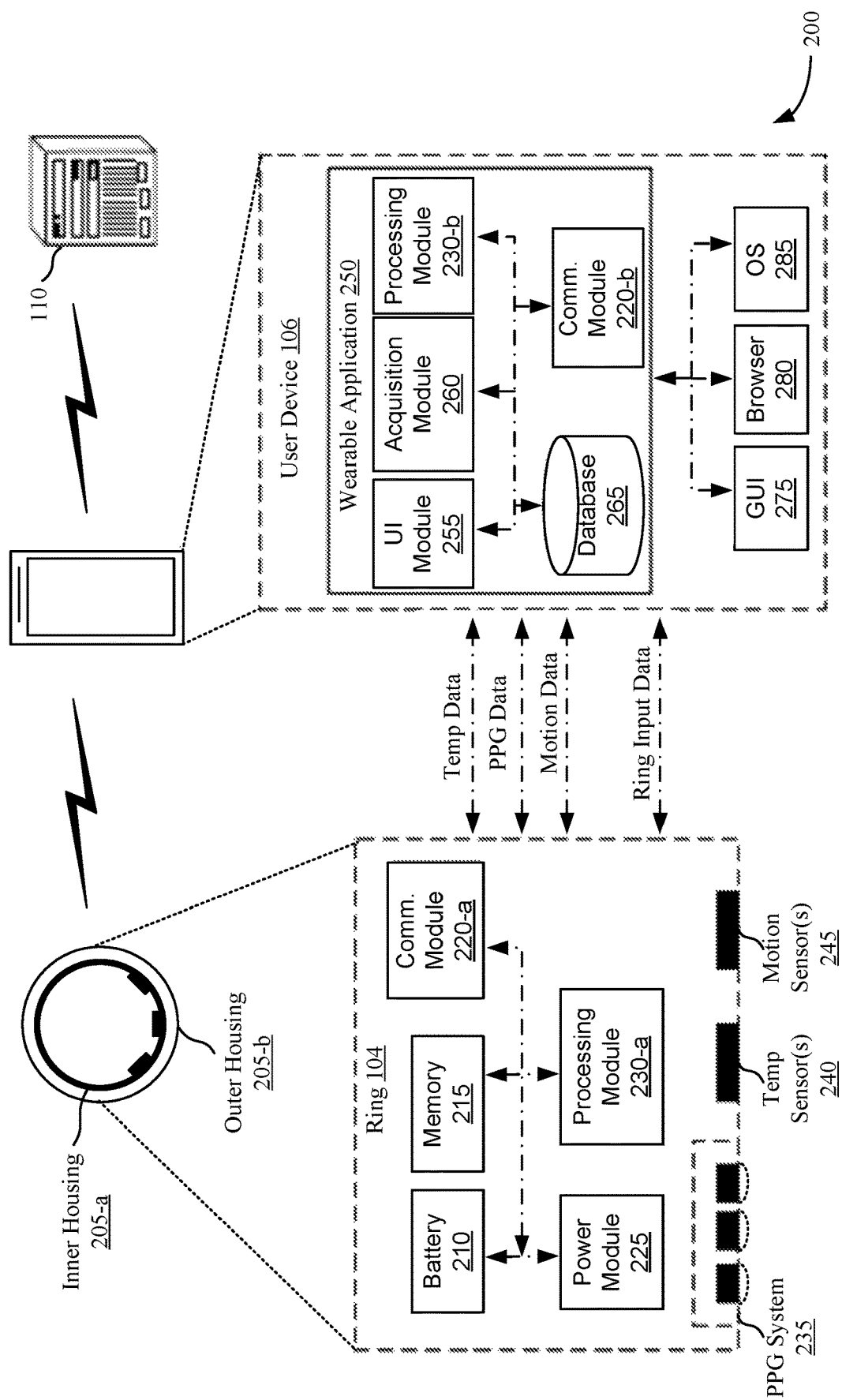
FIG. 2 illustrates an example of a system that supports techniques for providing physiological state-related insights associated with a user, in accordance with aspects of the present disclosure.

FIG. 2 illustrates an example of a system 200 that supports techniques for providing physiological state related insights associated with a user, in accordance with aspects of the present disclosure. The system 200 may implement, or be implemented by, the system 100. In particular, system 200 illustrates an example of a ring 104 (e.g., wearable device 104), a user device 106, and a server 110, as described with reference to FIG. 1.

In some aspects, the ring 104 may be configured to be worn around a user's finger, and may determine one or more user physiological parameters when worn around the user's finger. Example measurements and determinations may include, but are not limited to, user skin temperature, pulse waveforms, respiratory rate, heart rate, HRV, blood oxygen levels, and the like.

The system 200 further includes a user device 106 (e.g., a smartphone) in communication with the ring 104. For example, the ring 104 may be in wireless and/or wired communication with the user device 106. In some implementations, the ring 104 may send measured and processed data (e.g., temperature data, photoplethysmogram (PPG) data, motion/accelerometer data, ring input data, and the like) to the user device 106. The user device 106 may also send data to the ring 104, such as ring 104 firmware/configuration updates. The user device 106 may process data. In some implementations, the user device 106 may transmit data to the server 110 for processing and/or storage.

The ring 104 may include a housing 205 that may include an inner housing 205-*a* and an outer housing 205-*b*. In some aspects, the housing 205 of the ring 104 may store or otherwise include various components of the ring including, but not limited to, device electronics, a power source (e.g., battery 210, and/or capacitor), one or more substrates (e.g., printable circuit boards) that interconnect the device electronics and/or power source, and the like. The device electronics may include device modules (e.g., hardware/software), such as: a processing module 230-*a*, a memory 215, a communication module 220-*a*, a power module 225, and the like. The device electronics may also include one or more sensors. Example sensors may include one or more temperature sensors 240, a PPG sensor assembly (e.g., PPG system 235), and one or more motion sensors 245.

The sensors may include associated modules (not illustrated) configured to communicate with the respective components/modules of the ring 104, and generate signals associated with the respective sensors. In some aspects, each of the components/modules of the ring 104 may be communicatively coupled to one another via wired or wireless connections. Moreover, the ring 104 may include additional and/or alternative sensors or other components that are configured to collect physiological data from the user, including light sensors (e.g., LEDs), oximeters, and the like.

The ring 104 shown and described with reference to FIG. 2 is provided solely for illustrative purposes. As such, the ring 104 may include additional or alternative components as those illustrated in FIG. 2. Other rings 104 that provide functionality described herein may be fabricated. For example, rings 104 with fewer components (e.g., sensors) may be fabricated. In a specific example, a ring 104 with a single temperature sensor 240 (or other sensor), a power source, and device electronics configured to read the single temperature sensor 240 (or other sensor) may be fabricated. In another specific example, a temperature sensor 240 (or other sensor) may be attached to a user's finger (e.g., using clamps, spring loaded clamps, etc.). In this case, the sensor may be wired to another computing device, such as a wrist worn computing device that reads the temperature sensor 240 (or other sensor). In other examples, a ring 104 that includes additional sensors and processing functionality may be fabricated.

The housing 205 may include one or more housing 205 components. The housing 205 may include an outer housing 205-*b* component (e.g., a shell) and an inner housing 205-*a* component (e.g., a molding). The housing 205 may include additional components (e.g., additional layers) not explicitly illustrated in FIG. 2. For example, in some implementations, the ring 104 may include one or more insulating layers that electrically insulate the device electronics and other conductive materials (e.g., electrical traces) from the outer housing 205-*b* (e.g., a metal outer housing 205-*b*). The housing 205 may provide structural support for the device electronics, battery 210, substrate(s), and other components. For example, the housing 205 may protect the device electronics, battery 210, and substrate(s) from mechanical forces, such as pressure and impacts. The housing 205 may also protect the device electronics, battery 210, and substrate(s) from water and/or other chemicals.

The outer housing 205-*b* may be fabricated from one or more materials. In some implementations, the outer housing 205-*b* may include a metal, such as titanium, that may provide strength and abrasion resistance at a relatively light weight. The outer housing 205-*b* may also be fabricated from other materials, such polymers. In some implementations, the outer housing 205-*b* may be protective as well as decorative.

The inner housing 205-*a* may be configured to interface with the user's finger. The inner housing 205-*a* may be formed from a polymer (e.g., a medical grade polymer) or other material. In some implementations, the inner housing 205-*a* may be transparent. For example, the inner housing 205-*a* may be transparent to light emitted by the PPG light emitting diodes (LEDs). In some implementations, the inner housing 205-*a* component may be molded onto the outer housing 205-*b*. For example, the inner housing 205-*a* may include a polymer that is molded (e.g., injection molded) to fit into an outer housing 205-*b* metallic shell.

The ring 104 may include one or more substrates (not illustrated). The device electronics and battery 210 may be included on the one or more substrates. For example, the device electronics and battery 210 may be mounted on one or more substrates. Example substrates may include one or more printed circuit boards (PCBs), such as flexible PCB (e.g., polyimide). In some implementations, the electronics/battery 210 may include surface mounted devices (e.g., surface-mount technology (SMT) devices) on a flexible PCB. In some implementations, the one or more substrates (e.g., one or more flexible PCBs) may include electrical traces that provide electrical communication between device electronics. The electrical traces may also connect the battery 210 to the device electronics.

The device electronics, battery 210, and substrates may be arranged in the ring 104 in a variety of ways. In some implementations, one substrate that includes device electronics may be mounted along the bottom of the ring 104 (e.g., the bottom half), such that the sensors (e.g., PPG system 235, temperature sensors 240, motion sensors 245, and other sensors) interface with the underside of the user's finger. In these implementations, the battery 210 may be included along the top portion of the ring 104 (e.g., on another substrate).

The various components/modules of the ring 104 represent functionality (e.g., circuits and other components) that may be included in the ring 104. Modules may include any discrete and/or integrated electronic circuit components that implement analog and/or digital circuits capable of producing the functions attributed to the modules herein. For example, the modules may include analog circuits (e.g., amplification circuits, filtering circuits, analog/digital conversion circuits, and/or other signal conditioning circuits). The modules may also include digital circuits (e.g., combinational or sequential logic circuits, memory circuits etc.).

The memory 215 (memory module) of the ring 104 may include any volatile, non-volatile, magnetic, or electrical media, such as a random access memory (RAM), read-only memory (ROM), non-volatile RAM (NVRAM), electrically-erasable programmable ROM (EEPROM), flash memory, or any other memory device. The memory 215 may store any of the data described herein. For example, the memory 215 may be configured to store data (e.g., motion data, temperature data, PPG data) collected by the respective sensors and PPG system 235. Furthermore, memory 215 may include instructions that, when executed by one or more processing circuits, cause the modules to perform various functions attributed to the modules herein. The device electronics of the ring 104 described herein are only example device electronics. As such, the types of electronic components used to implement the device electronics may vary based on design considerations.

The functions attributed to the modules of the ring 104 described herein may be embodied as one or more processors, hardware, firmware, software, or any combination thereof. Depiction of different features as modules is intended to highlight different functional aspects and does not necessarily imply that such modules must be realized by separate hardware/software components. Rather, functionality associated with one or more modules may be performed by separate hardware/software components or integrated within common hardware/software components.

The processing module 230-a of the ring 104 may include one or more processors (e.g., processing units), microcontrollers, digital signal processors, systems on a chip (SOCs), and/or other processing devices. The processing module 230-a communicates with the modules included in the ring 104. For example, the processing module 230-a may transmit/receive data to/from the modules and other components of the ring 104, such as the sensors. As described herein, the modules may be implemented by various circuit components. Accordingly, the modules may also be referred to as circuits (e.g., a communication circuit and power circuit).

The processing module 230-a may communicate with the memory 215. The memory 215 may include computer-readable instructions that, when executed by the processing module 230-a, cause the processing module 230-a to perform the various functions attributed to the processing module 230-a herein. In some implementations, the processing module 230-a (e.g., a microcontroller) may include additional features associated with other modules, such as communication functionality provided by the communication module 220-a (e.g., an integrated Bluetooth Low Energy transceiver) and/or additional onboard memory 215.

The communication module 220-a may include circuits that provide wireless and/or wired communication with the user device 106 (e.g., communication module 220-b of the user device 106). In some implementations, the communication modules 220-a, 220-b may include wireless communication circuits, such as Bluetooth circuits and/or Wi-Fi circuits. In some implementations, the communication modules 220-a, 220-b can include wired communication circuits, such as Universal Serial Bus (USB) communication circuits. Using the communication module 220-a, the ring 104 and the user device 106 may be configured to communicate with each other. The processing module 230-a of the ring may be configured to transmit/receive data to/from the user device 106 via the communication module 220-a. Example data may include, but is not limited to, motion data, temperature data, pulse waveforms, heart rate data, HRV data, PPG data, and status updates (e.g., charging status, battery charge level, and/or ring 104 configuration settings). The processing module 230-a of the ring may also be configured to receive updates (e.g., software/firmware updates) and data from the user device 106.

The ring 104 may include a battery 210 (e.g., a rechargeable battery 210). An example battery 210 may include a Lithium-Ion or Lithium-Polymer type battery 210, although a variety of battery 210 options are possible. The battery 210 may be wirelessly charged. In some implementations, the ring 104 may include a power source other than the battery 210, such as a capacitor. The power source (e.g., battery 210 or capacitor) may have a curved geometry that matches the curve of the ring 104. In some aspects, a charger or other power source may include additional sensors that may be used to collect data in addition to, or that supplements, data collected by the ring 104 itself. Moreover, a charger or other power source for the ring 104 may function as a user device 106, in which case the charger or other power source for the ring 104 may be configured to receive data from the ring 104, store and/or process data received from the ring 104, and communicate data between the ring 104 and the servers 110.

In some aspects, the ring 104 includes a power module 225 that may control charging of the battery 210. For example, the power module 225 may interface with an external wireless charger that charges the battery 210 when interfaced with the ring 104. The charger may include a datum structure that mates with a ring 104 datum structure to create a specified orientation with the ring 104 during 104 charging. The power module 225 may also regulate voltage (s) of the device electronics, regulate power output to the device electronics, and monitor the state of charge of the battery 210. In some implementations, the battery 210 may include a protection circuit module (PCM) that protects the battery 210 from high current discharge, over voltage during 104 charging, and under voltage during 104 discharge. The power module 225 may also include electro-static discharge (ESD) protection.

The one or more temperature sensors 240 may be electrically coupled to the processing module 230-a. The temperature sensor 240 may be configured to generate a temperature signal (e.g., temperature data) that indicates a temperature read or sensed by the temperature sensor 240. The processing module 230-a may determine a temperature of the user in the location of the temperature sensor 240. For example, in the ring 104, temperature data generated by the temperature sensor 240 may indicate a temperature of a user at the user's finger (e.g., skin temperature). In some implementations, the temperature sensor 240 may contact the user's skin. In other implementations, a portion of the housing 205 (e.g., the inner housing 205-a) may form a barrier (e.g., a thin, thermally conductive barrier) between the temperature sensor 240 and the user's skin. In some implementations, portions of the ring 104 configured to contact the user's finger may have thermally conductive portions and thermally insulative portions. The thermally conductive portions may conduct heat from the user's finger to the temperature sensors 240. The thermally insulative portions may insulate portions of the ring 104 (e.g., the temperature sensor 240) from ambient temperature.

In some implementations, the temperature sensor 240 may generate a digital signal (e.g., temperature data) that the processing module 230-a may use to determine the temperature. As another example, in cases where the temperature sensor 240 includes a passive sensor, the processing module 230-a (or a temperature sensor 240 module) may measure a current/voltage generated by the temperature sensor 240 and determine the temperature based on the measured current/voltage. Example temperature sensors 240 may include a thermistor, such as a negative temperature coefficient (NTC) thermistor, or other types of sensors including resistors, transistors, diodes, and/or other electrical/electronic components.

The processing module 230-a may sample the user's temperature over time. For example, the processing module 230-a may sample the user's temperature according to a sampling rate. An example sampling rate may include one sample per second, although the processing module 230-a may be configured to sample the temperature signal at other sampling rates that are higher or lower than one sample per second. In some implementations, the processing module 230-a may sample the user's temperature continuously throughout the day and night. Sampling at a sufficient rate (e.g., one sample per second) throughout the day may provide sufficient temperature data for analysis described herein.

The processing module 230-a may store the sampled temperature data in memory 215. In some implementations, the processing module 230-a may process the sampled temperature data. For example, the processing module 230-a may determine average temperature values over a period of time. In one example, the processing module 230-a may determine an average temperature value each minute by summing all temperature values collected over the minute and dividing by the number of samples over the minute. In a specific example where the temperature is sampled at one sample per second, the average temperature may be a sum of all sampled temperatures for one minute divided by sixty seconds. The memory 215 may store the average temperature values over time. In some implementations, the memory 215 may store average temperatures (e.g., one per minute) instead of sampled temperatures in order to conserve memory 215.

The sampling rate, which may be stored in memory 215, may be configurable. In some implementations, the sampling rate may be the same throughout the day and night. In other implementations, the sampling rate may be changed throughout the day/night. In some implementations, the ring 104 may filter/reject temperature readings, such as large spikes in temperature that are not indicative of physiological changes (e.g., a temperature spike from a hot shower). In some implementations, the ring 104 may filter/reject temperature readings that may not be reliable due to other factors, such as excessive motion during 104 exercise (e.g., as indicated by a motion sensor 245).

The ring 104 (e.g., communication module) may transmit the sampled and/or average temperature data to the user device 106 for storage and/or further processing. The user device 106 may transfer the sampled and/or average temperature data to the server 110 for storage and/or further processing.

Although the ring 104 is illustrated as including a single temperature sensor 240, the ring 104 may include multiple temperature sensors 240 in one or more locations, such as arranged along the inner housing 205-a near the user's finger. In some implementations, the temperature sensors 240 may be stand-alone temperature sensors 240. Additionally, or alternatively, one or more temperature sensors 240 may be included with other components (e.g., packaged with other components), such as with the accelerometer and/or processor.

The processing module 230-a may acquire and process data from multiple temperature sensors 240 in a similar manner described with respect to a single temperature sensor 240. For example, the processing module 230 may individually sample, average, and store temperature data from each of the multiple temperature sensors 240. In other examples, the processing module 230-a may sample the sensors at different rates and average/store different values for the different sensors. In some implementations, the processing module 230-a may be configured to determine a single temperature based on the average of two or more temperatures determined by two or more temperature sensors 240 in different locations on the finger.

The temperature sensors 240 on the ring 104 may acquire distal temperatures at the user's finger (e.g., any finger). For example, one or more temperature sensors 240 on the ring 104 may acquire a user's temperature from the underside of a finger or at a different location on the finger. In some implementations, the ring 104 may continuously acquire distal temperature (e.g., at a sampling rate). Although distal temperature measured by a ring 104 at the finger is described herein, other devices may measure temperature at the same/different locations. In some cases, the distal temperature measured at a user's finger may differ from the temperature measured at a user's wrist or other external body location. Additionally, the distal temperature measured at a user's finger (e.g., a "shell" temperature) may differ from the user's core temperature. As such, the ring 104 may provide a useful temperature signal that may not be acquired at other internal/external locations of the body. In some cases, continuous temperature measurement at the finger may capture temperature fluctuations (e.g., small or large fluctuations) that may not be evident in core temperature. For example, continuous temperature measurement at the finger may capture minute-to-minute or hour-to-hour temperature fluctuations that provide additional insight that may not be provided by other temperature measurements elsewhere in the body.

The ring 104 may include a PPG system 235. The PPG system 235 may include one or more optical transmitters that transmit light. The PPG system 235 may also include one or more optical receivers that receive light transmitted by the one or more optical transmitters. An optical receiver may generate a signal (hereinafter "PPG" signal) that indicates an amount of light received by the optical receiver. The optical transmitters may illuminate a region of the user's finger. The PPG signal generated by the PPG system 235 may indicate the perfusion of blood in the illuminated region. For example, the PPG signal may indicate blood volume changes in the illuminated region caused by a user's pulse pressure. The processing module 230-a may sample the PPG signal and determine a user's pulse waveform based on the PPG signal. The processing module 230-a may determine a variety of physiological parameters based on the user's pulse waveform, such as a user's respiratory rate, heart rate, HRV, oxygen saturation, and other circulatory parameters.

In some implementations, the PPG system 235 may be configured as a reflective PPG system 235 where the optical receiver(s) receive transmitted light that is reflected through the region of the user's finger. In some implementations, the PPG system 235 may be configured as a transmissive PPG system 235 where the optical transmitter(s) and optical receiver(s) are arranged opposite to one another, such that light is transmitted directly through a portion of the user's finger to the optical receiver(s).

The number and ratio of transmitters and receivers included in the PPG system 235 may vary. Example optical transmitters may include light-emitting diodes (LEDs). The optical transmitters may transmit light in the infrared spectrum and/or other spectrums. Example optical receivers may include, but are not limited to, photosensors, phototransistors, and photodiodes. The optical receivers may be configured to generate PPG signals in response to the wavelengths received from the optical transmitters. The location of the transmitters and receivers may vary. Additionally, a single device may include reflective and/or transmissive PPG systems 235.

The PPG system 235 illustrated in FIG. 2 may include a reflective PPG system 235 in some implementations. In these implementations, the PPG system 235 may include a centrally located optical receiver (e.g., at the bottom of the ring 104) and two optical transmitters located on each side of the optical receiver. In this implementation, the PPG system 235 (e.g., optical receiver) may generate the PPG signal based on light received from one or both of the optical transmitters. In other implementations, other placements, combinations, and/or configurations of one or more optical transmitters and/or optical receivers are contemplated.

The processing module 230-a may control one or both of the optical transmitters to transmit light while sampling the PPG signal generated by the optical receiver. In some implementations, the processing module 230-a may cause the optical transmitter with the stronger received signal to transmit light while sampling the PPG signal generated by the optical receiver. For example, the selected optical transmitter may continuously emit light while the PPG signal is sampled at a sampling rate (e.g., 250 Hz).

Sampling the PPG signal generated by the PPG system 235 may result in a pulse waveform that may be referred to as a "PPG." The pulse waveform may indicate blood pressure vs time for multiple cardiac cycles. The pulse waveform may include peaks that indicate cardiac cycles. Additionally, the pulse waveform may include respiratory induced variations that may be used to determine respiration rate. The processing module 230-a may store the pulse waveform in memory 215 in some implementations. The processing module 230-a may process the pulse waveform as it is generated and/or from memory 215 to determine user physiological parameters described herein.

The processing module 230-a may determine the user's heart rate based on the pulse waveform. For example, the processing module 230-a may determine heart rate (e.g., in beats per minute) based on the time between peaks in the pulse waveform. The time between peaks may be referred to as an interbeat interval (IBI). The processing module 230-a may store the determined heart rate values and IBI values in memory 215.

The processing module 230-a may determine HRV over time. For example, the processing module 230-a may determine HRV based on the variation in the IBIs. The processing module 230-a may store the HRV values over time in the memory 215. Moreover, the processing module 230-a may determine the user's respiratory rate over time. For example, the processing module 230-a may determine respiratory rate based on frequency modulation, amplitude modulation, or baseline modulation of the user's IBI values over a period of time. Respiratory rate may be calculated in breaths per minute or as another breathing rate (e.g., breaths per 30 seconds). The processing module 230-a may store user respiratory rate values over time in the memory 215.

The ring 104 may include one or more motion sensors 245, such as one or more accelerometers (e.g., 6-D accelerometers) and/or one or more gyroscopes (gyros). The motion sensors 245 may generate motion signals that indicate motion of the sensors. For example, the ring 104 may include one or more accelerometers that generate acceleration signals that indicate acceleration of the accelerometers. As another example, the ring 104 may include one or more gyro sensors that generate gyro signals that indicate angular motion (e.g., angular velocity) and/or changes in orientation. The motion sensors 245 may be included in one or more sensor packages. An example accelerometer/gyro sensor is a Bosch BMI160 inertial micro electro-mechanical system (MEMS) sensor that may measure angular rates and accelerations in three perpendicular axes.

The processing module 230-a may sample the motion signals at a sampling rate (e.g., 50 Hz) and determine the motion of the ring 104 based on the sampled motion signals. For example, the processing module 230-a may sample acceleration signals to determine acceleration of the ring 104. As another example, the processing module 230-a may sample a gyro signal to determine angular motion. In some implementations, the processing module 230-a may store motion data in memory 215. Motion data may include sampled motion data as well as motion data that is calculated based on the sampled motion signals (e.g., acceleration and angular values).

The ring 104 may store a variety of data described herein. For example, the ring 104 may store temperature data, such as raw sampled temperature data and calculated temperature data (e.g., average temperatures). As another example, the ring 104 may store PPG signal data, such as pulse waveforms and data calculated based on the pulse waveforms (e.g., heart rate values, IBI values, HRV values, and respiratory rate values). The ring 104 may also store motion data, such as sampled motion data that indicates linear and angular motion.

The ring 104, or other computing device, may calculate and store additional values based on the sampled/calculated physiological data. For example, the processing module 230 may calculate and store various metrics, such as sleep metrics (e.g., a Sleep Score), activity metrics, and readiness metrics. In some implementations, additional values/metrics may be referred to as "derived values." The ring 104, or other computing/wearable device, may calculate a variety of values/metrics with respect to motion. Example derived values for motion data may include, but are not limited to, motion count values, regularity values, intensity values, metabolic equivalence of task values (METs), and orientation values. Motion counts, regularity values, intensity values, and METs may indicate an amount of user motion (e.g., velocity/acceleration) over time. Orientation values may indicate how the ring 104 is oriented on the user's finger and if the ring 104 is worn on the left hand or right hand.

In some implementations, motion counts and regularity values may be determined by counting a number of acceleration peaks within one or more periods of time (e.g., one or more 30 second to 1 minute periods). Intensity values may indicate a number of movements and the associated intensity (e.g., acceleration values) of the movements. The intensity values may be categorized as low, medium, and high, depending on associated threshold acceleration values. METs may be determined based on the intensity of movements during a period of time (e.g., 30 seconds), the regularity/irregularity of the movements, and the number of movements associated with the different intensities.

In some implementations, the processing module 230-a may compress the data stored in memory 215. For example, the processing module 230-a may delete sampled data after making calculations based on the sampled data. As another example, the processing module 230-a may average data over longer periods of time in order to reduce the number of stored values. In a specific example, if average temperatures for a user over one minute are stored in memory 215, the processing module 230-a may calculate average temperatures over a five minute time period for storage, and then subsequently erase the one minute average temperature data. The processing module 230-a may compress data based on a variety of factors, such as the total amount of used/available memory 215 and/or an elapsed time since the ring 104 last transmitted the data to the user device 106.

Although a user's physiological parameters may be measured by sensors included on a ring 104, other devices may measure a user's physiological parameters. For example, although a user's temperature may be measured by a temperature sensor 240 included in a ring 104, other devices may measure a user's temperature. In some examples, other wearable devices (e.g., wrist devices) may include sensors that measure user physiological parameters. Additionally, medical devices, such as external medical devices (e.g., wearable medical devices) and/or implantable medical devices, may measure a user's physiological parameters. One or more sensors on any type of computing device may be used to implement the techniques described herein.

The physiological measurements may be taken continuously throughout the day and/or night. In some implementations, the physiological measurements may be taken during 104 portions of the day and/or portions of the night. In some implementations, the physiological measurements may be taken in response to determining that the user is in a specific state, such as an active state, resting state, and/or a sleeping state. For example, the ring 104 can make physiological measurements in a resting/sleep state in order to acquire cleaner physiological signals. In one example, the ring 104 or other device/system may detect when a user is resting and/or sleeping and acquire physiological parameters (e.g., temperature) for that detected state. The devices/systems may use the resting/sleep physiological data and/or other data when the user is in other states in order to implement the techniques of the present disclosure.

In some implementations, as described previously herein, the ring 104 may be configured to collect, store, and/or process data, and may transfer any of the data described herein to the user device 106 for storage and/or processing. In some aspects, the user device 106 includes a wearable application 250, an operating system (OS), a web browser application (e.g., web browser 280), one or more additional applications, and a GUI 275. The user device 106 may further include other modules and components, including sensors, audio devices, haptic feedback devices, and the like. The wearable application 250 may include an example of an application (e.g., "app") that may be installed on the user device 106. The wearable application 250 may be configured to acquire data from the ring 104, store the acquired data, and process the acquired data as described herein. For example, the wearable application 250 may include a user interface (UI) module 255, an acquisition module 260, a processing module 230-b, a communication module 220-b, and a storage module (e.g., database 265) configured to store application data.

The various data processing operations described herein may be performed by the ring 104, the user device 106, the servers 110, or any combination thereof. For example, in some cases, data collected by the ring 104 may be pre-processed and transmitted to the user device 106. In this example, the user device 106 may perform some data processing operations on the received data, may transmit the data to the servers 110 for data processing, or both. For instance, in some cases, the user device 106 may perform processing operations that require relatively low processing power and/or operations that require a relatively low latency, whereas the user device 106 may transmit the data to the servers 110 for processing operations that require relatively high processing power and/or operations that may allow relatively higher latency.

In some aspects, the ring 104, user device 106, and server 110 of the system 200 may be configured to evaluate sleep patterns for a user. In particular, the respective components of the system 200 may be used to collect data from a user via the ring 104, and generate one or more scores (e.g., Sleep Score, Readiness Score) for the user based on the collected data. For example, as noted previously herein, the ring 104 of the system 200 may be worn by a user to collect data from the user, including temperature, heart rate, HRV, and the like. Data collected by the ring 104 may be used to determine when the user is asleep in order to evaluate the user's sleep for a given "sleep day." In some aspects, scores may be calculated for the user for each respective sleep day, such that a first sleep day is associated with a first set of scores, and a second sleep day is associated with a second set of scores. Scores may be calculated for each respective sleep day based on data collected by the ring 104 during the respective sleep day. Scores may include, but are not limited to, Sleep Scores, Readiness Scores, and the like.

In some cases, "sleep days" may align with the traditional calendar days, such that a given sleep day runs from midnight to midnight of the respective calendar day. In other cases, sleep days may be offset relative to calendar days. For example, sleep days may run from 6:00 pm (18:00) of a calendar day until 6:00 pm (18:00) of the subsequent calendar day. In this example, 6:00 pm may serve as a "cut-off time," where data collected from the user before 6:00 pm is counted for the current sleep day, and data collected from the user after 6:00 pm is counted for the subsequent sleep day. Due to the fact that most individuals sleep the most at night, offsetting sleep days relative to calendar days may enable the system 200 to evaluate sleep patterns for users in such a manner that is consistent with their sleep schedules. In some cases, users may be able to selectively adjust (e.g., via the GUI) a timing of sleep days relative to calendar days so that the sleep days are aligned with the duration of time that the respective users typically sleep.

In some implementations, each overall score for a user for each respective day (e.g., Sleep Score, Readiness Score) may be determined/calculated based on one or more "contributors," "factors," or "contributing factors." For example, a user's overall Sleep Score may be calculated based on a set of contributors, including: total sleep, efficiency, restfulness, REM sleep, deep sleep, latency, timing, or any combination thereof. The Sleep Score may include any quantity of contributors. The "total sleep" contributor may refer to the sum of all sleep periods of the sleep day. The "efficiency" contributor may reflect the percentage of time spent asleep compared to time spent awake while in bed, and may be calculated using the efficiency average of long sleep periods (e.g., primary sleep period) of the sleep day, weighted by a duration of each sleep period. The "restfulness" contributor may indicate how restful the user's sleep is, and may be calculated using the average of all sleep periods of the sleep day, weighted by a duration of each period. The restfulness contributor may be based on a "wake up count" (e.g., sum of all the wake-ups (when user wakes up) detected during different sleep periods), excessive movement, and a "got up count" (e.g., sum of all the got-ups (when user gets out of bed) detected during the different sleep periods).

The "REM sleep" contributor may refer to a sum total of REM sleep durations across all sleep periods of the sleep day including REM sleep. Similarly, the "deep sleep" contributor may refer to a sum total of deep sleep durations across all sleep periods of the sleep day including deep sleep. The "latency" contributor may signify how long (e.g., average, median, longest) the user takes to go to sleep, and may be calculated using the average of long sleep periods throughout the sleep day, weighted by a duration of each period and the number of such periods (e.g., consolidation of a given sleep stage or sleep stages may be its own contributor or weight other contributors). Lastly, the "timing" contributor may refer to a relative timing of sleep periods within the sleep day and/or calendar day, and may be calculated using the average of all sleep periods of the sleep day, weighted by a duration of each period.

By way of another example, a user's overall Readiness Score may be calculated based on a set of contributors, including: sleep, sleep balance, heart rate, HRV balance, recovery index, temperature, activity, activity balance, or any combination thereof. The Readiness Score may include any quantity of contributors. The "sleep" contributor may refer to the combined Sleep Score of all sleep periods within the sleep day. The "sleep balance" contributor may refer to a cumulative duration of all sleep periods within the sleep day. In particular, sleep balance may indicate to a user whether the sleep that the user has been getting over some duration of time (e.g., the past two weeks) is in balance with the user's needs. Typically, adults need 7-9 hours of sleep a night to stay healthy, alert, and to perform at their best both mentally and physically. However, it is normal to have an occasional night of bad sleep, so the sleep balance contributor takes into account long-term sleep patterns to determine whether each user's sleep needs are being met. The "resting heart rate" contributor may indicate a lowest heart rate from the longest sleep period of the sleep day (e.g., primary sleep period) and/or the lowest heart rate from naps occurring after the primary sleep period.

Continuing with reference to the "contributors" (e.g., factors, contributing factors) of the Readiness Score, the "HRV balance" contributor may indicate a highest HRV average from the primary sleep period and the naps happening after the primary sleep period. The HRV balance contributor may help users keep track of their recovery status by comparing their HRV trend over a first time period (e.g., two weeks) to an average HRV over some second, longer time period (e.g., three months). The "recovery index" contributor may be calculated based on the longest sleep period. Recovery index measures how long it takes for a user's resting heart rate to stabilize during the night. A sign of a very good recovery is that the user's resting heart rate stabilizes during the first half of the night, at least six hours before the user wakes up, leaving the body time to recover for the next day. The "body temperature" contributor may be calculated based on the longest sleep period (e.g., primary sleep period) or based on a nap happening after the longest sleep period if the user's highest temperature during the nap is at least 0.5° C. higher than the highest temperature during the longest period. In some aspects, the ring may measure a user's body temperature while the user is asleep, and the system 200 may display the user's average temperature relative to the user's baseline temperature. If a user's body temperature is outside of their normal range (e.g., clearly above or below 0.0), the body temperature contributor may be highlighted (e.g., go to a "Pay attention" state) or otherwise generate an alert for the user.

In some implementations, some characteristics can be measured with the wearable device 104 and/or the user device 106, some attributes can be derived ("derived attributes") from the measurements, and some attributes can be further derived ("further derived attributes") from the measurements and/or the derived attributes. The measurements may include at least one of the following: an interbeat interval (IBI), physical activity (intensity, duration, time), skin temperature, current time and time zone, ambient light exposure, mental load, eating. The derived attributes may include at least one of the following: resting heartrate, respiration rate, sleep phases, sleep time, bed time, activity preference. The further derived attributes may include at least one of the following: sleep mid-point, sleep onset latency, voluntary wake up time, circadian type (morning/evening), circadian rhythm, circadian alertness curve, sleep drive curve, entraining effect index, sleepiness index, readiness.

Attendant advantages of the present disclosure may be further shown and described with reference to FIG. 3.

Figure 3:
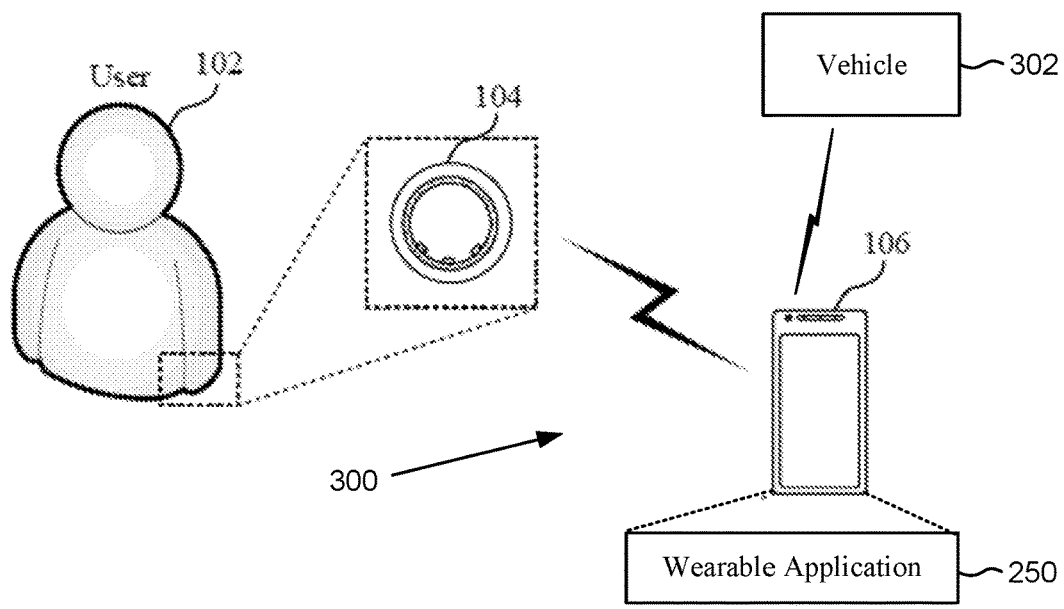
FIG. 3 illustrates an example of a system that supports techniques for providing physiological state-related insights associated with a user, in accordance with aspects of the present disclosure.

FIG. 3 illustrates an example of a system 300 that supports techniques for providing physiological state-related insights associated with a user, in accordance with aspects of the present disclosure. Aspects of the system 300 may implement, or may be implemented by, aspects of the system 100, the system 200, or both. For example, the system 300 may support techniques for providing physiological state-related insights associated with a user, as described herein.

The system 300 includes a user 102, a wearable device 104 (e.g., wearable ring device 104), and a user device 106, which may be examples of corresponding devices as described in FIGS. 1 and 2. In some embodiments, the system 300 may also include a vehicle 302 that may be connected to the user device 106 via a wired or a wireless connection. The vehicle 302 may be any vehicle that can be driven by the user 102 or with which the user 102 can travel, for example, a car, a bicycle, a train, an airplane, a bus, a boat or other watercraft, an electric scooter etc. The user device 106 may execute a wearable application 250. In some embodiments, the user 102 may use several separate vehicles during a single traveling event.

The system 300 may provide physiological state-related insights associated with the user 102. As it is used herein, the term "physiological state-related insight associated with the user" may refer, for example, to a message, an instruction, an indication, user guidance information, user alertness information or user status information representing the user's current alertness data or physiological status or any combination thereof that may be output by the user device 106 or transmitted to the vehicle 302.

The wearable application 250 may receive baseline physiological data associated with the user 102 from the wearable device 104. The physiological baseline data comprising measured physiological parameters may include any physiological data known in the art including, but not limited to, temperature data, accelerometer data (e.g., movement/motion data), sleep data, heart rate data, HRV data, blood oxygen level data, respiration rate data, or any combination thereof. Although FIG. 3 illustrates only one wearable device 104, in other embodiments there may be multiple wearable devices associated with the user 102.

The wearable application 250 may obtain a physiological baseline associated with the user based at least in part on the baseline physiological data associated with the user, the physiological baseline providing reference user alertness data. The physiological baseline associated with the user may be determined by the wearable device 104, the user wearable application 250 or an external processing device or any combination of thereof. The reference user alertness data may be derived from the baseline physiological data, i.e. from the actual measurements measured by the wearable device, for example, daytime heart rate data (e.g., heart rate while the user is awake), nighttime heart rate data (e.g., heart rate while the user is asleep), workout heart rate data (e.g., heart rate during a workout), restorative time (e.g., time the user spends in a relaxed state), temperature, respiration rate, blood oxygen saturation, activity/movement, or any combination thereof.

The wearable application 250 may receive additional physiological data associated with the user from the at least one wearable device. For example, the additional physiological data associated with the user may relate, for example, to the last 24, 48 or 72 hour time period or any other applicable time period.

The wearable application 250 may obtain current user alertness data based at least in part on the additional physiological data associated with the user. The current user alertness data may be derived from the additional physiological data, i.e. from the actual measurements measured by the wearable device, for example, a heart rate, skin temperature, blood oxygen saturation, activity/movement etc. In other words, the current user alertness data represents the current state of the user derived from the latest measurements provided by the wearable device 104 obtained during a specific time period, for example, the last 24, 48 or 72 hours or any other applicable time period. The current user alertness data may then be taken into account when the user starts a traveling event or is about to start the traveling event in the (near) future.

The term "alertness data" in this context may encompass not only alertness or readiness of the user, or the lack of alertness or readiness of the user, but also physical and mental recovery from various kinds of stress. The alertness may be an estimation of the physiological and/or mental state of the user to perform well at a given moment in time. It may summarize both physical and mental prerequisites for a good day, for example. In essence, it may cover the effects of earlier physical activity, previous night's sleep, and respective body responses measured. Body responses can mean, for example, temperature, resting heart rates relative to user's own normative values, or how much they have changed as response to previous day's physical activity. The terms "alertness data", "alertness score", "alertness level", "recovery data", "readiness data", "readiness level" and "readiness score" can be used interchangeably in this description.

In an embodiment, the user device is configured to calculate the baseline and/or the alertness level/readiness score for assessing readiness of the user. Specifically, based on long data, trends, cross-correlation analysis of the deep data analysis (i.e. heart rate variability, hypnogram, stress level and the like) the readiness score may be calculated. Further, the long data, trends, cross-correlation analysis may be associated with a time period (for example a day, a week or a month) for which the deep data analysis is performed. Therefore, the measured user movements, and biosignals such as heart rate, hypnogram, heart rate variability and stress level for such time period are correlated to calculate the readiness score and thereby assessing readiness of the user.

The readiness score indicates a level of readiness of the user as well as the recovery of the user from the mental and physical load. The terms 'readiness' or 'alertness' used herein may also describe a return to a normal state of mental and physical strength (or energy level) after the mental and physical load. In an example, if the physical load is associated with an activity period (such as physical exercise), the readiness score may be based on the heart rate, heart rate variability and stress level of the user. For example, the readiness score may be good or high (such as about 90%), if the heart rate, heart rate variability and stress level of the user have returned to the normal state after the exercise. Similarly, if the mental load is associated with a rest period (such as sleep), the readiness score may be based on the movements, heart rate and hypnogram of the user. For example, the readiness score may be good or high (such as about 90%), if the user moves less, the heart rate is within a desired level (70-40 beats per minutes) and the hypnogram shows a good amount of deep sleep.

In one embodiment, historical data of the user is also used for calculating the readiness score. For example, the historical data may include information related to a medical history of the user, but also on historical data collected by the system itself. For example, the historical data may comprise data showing how the user typically recovers from a load. Otherwise, the historical data may include information related to past professional life, food habits, and the like. Therefore, it may be evident to those skilled in the art that the historical data may have substantial influence on measurement of the readiness score of the user.

The solution illustrated herein may use different calculation parameters and may be designed to learn from previous measurements. For example, data from previous week, two weeks, a month or two months (or any other time lapse) may be used to set personalized calibrations, averages and/or limits, that are typical to the user. Furthermore, the gathered physiological data may be used for varying the weight that is given to different aspects measured or obtained from the user.

Measuring or obtaining the user's movements provides movement data and the measuring of at least one biosignal provides biosignal or biosignal data (which terms can be used interchangeably). The obtained movement data of the user during the rest period can be used for various purposes. For example, it is typically used to determine whether a moment of time belongs to the activity period or the rest period or possibly a further type of period if one or more such further types of period(s) have been defined. Further, it can be used as part of the starting data for determining the rest summary. A biosignal or several biosignals is determined during a rest period, but may also be determined during an activity period. For example, in case the temperature of the user is elevated during a rest period, it may be continued to be monitored during a following activity period, in order to ensure whether the increase was due to fever or another reason. Furthermore, elevated temperature readings such as fever can be programmed to adjust the readiness/alertness over an extended period of time, i.e. not only the following day. In practice, after being sick one or more days it will be beneficial to take additional easy days proportional to the length of the sickness.

User's movements may be measured or retrieved from the wearable device and/or from a separate device. The user's movements can comprise, for example, actual movements such as raising an arm or a hand, walking, running etc., or accumulated steps, an active time or a distance covered by the user.

In one embodiment, the wearable device may include at least one motion sensor, such an accelerometer, a gyroscope, a magnetic field sensor or a combination thereof, to measure user's movement. The motion sensor is configured to generate motion data that is indicative of the movements of the user. For example, the motion sensor may be configured to determine linear motion information, rotational motion information, and the like. Further, such information (linear motion or rotational motion) may be combined or correlated to generate the motion data that is indicative of the user's movement. As mentioned above, the movement data can also be generated by a separate device and retrieved or obtained by the ring or the server.

The wearable application 250 may identify a trigger condition for providing a physiological state-related insight associated with the user relating to the traveling event based at least in part on a comparison between the current user alertness data and the reference user alertness data. For example, the comparison may reveal that the user's current alertness data is reduced compared to the reference user alertness data. The reduced user alertness data means that some factors have an effect on the user that shows in the physiological data measured by the wearable device 104. For example, the trigger condition may be identified when the current user alertness data differs from the reference user alertness data by a predetermined threshold amount or level. In some embodiments, the user alertness data and the reference user alertness data can be expressed as percentage values. Thus, in some embodiments, the predetermined threshold amount may also be expressed as a percentage value. For example, the user alertness data may currently be 40% and the reference user alertness data is 75%. If the predetermined threshold amount is, for example, 30%, the trigger condition may be identified as the difference between the reference user alertness data and reference user alertness data is larger than 30%.

For example, the current user alertness data may indicate that the user has slept poorly for the last three nights. This then may cause the current user alertness data to fall below the reference user alertness data, and trigger the physiological state-related insight associated with the user relating to the traveling event. In some embodiments, there may be different threshold levels for identifying a trigger condition. For example, a different physiological state-related insight associated with the user relating to the traveling event may be triggered depending on the comparison result. When the comparison reveals a first comparison result, a first physiological state-related insight associated with the user relating to the traveling event involving the vehicle may be provided. When the comparison reveals a second comparison result, a second physiological state-related insight associated with the user relating to the traveling event involving the vehicle may be provided. For example, the first comparison result may indicate that the user should take a short break during a driving event. The second comparison result may indicate that the user should have a longer break during the driving event.

The wearable application 250 may cause the user device 106 to provide the physiological state-related insight associated with the user. For example, the user device 106 itself may be caused to output the physiological state-related insight associated with the user. In some embodiments, a graphical user interface (GUI) of the user device 106 may be configured to display the physiological state-related insight. The GUI may, for example, display a message or a notification to the user, for example, "take a short break", "drive slower", "keep more distance to the car ahead of you", "have a cup of coffee" etc. In some embodiments, the user device 106 may be configured to provide at least one of an auditory alert, a haptic alert and a visual alert associated with the physiological state-related insight. For example, the user device 106 may provide an auditory message to the user via a speaker, for example, "take a short break", "drive slower", "keep more distance to the car ahead of you", "have a cup of coffee". In another example, the auditory alert may be a predetermined audio signal provided via the speaker, for example, a buzzer signal to alert the user. The audio signal may also indicate that a more detailed message is indicated on the GUI. In another example, the user device 106 may provide a predetermined haptic pattern to alert the user. In another example, the wearable application 250 may cause the user device 106 to instruct the wearable device 104 to provide a haptic alert.

In some embodiments, the traveling event may be a future traveling event. The future traveling event may be determined, for example, based on a calendar entry in a calendar associated with the user 102. The calendar entry may, for example, indicate information about the traveling event, for example, that the user 106 will start a long car drive tomorrow or that the user 106 has a long intercontinental flight tomorrow. In another example, the calendar entry may indicate a client meeting at a location that requires a long car travel or a long flight. In another example, the calendar may indicate a busy day, and that after the day, there is a long travel ahead. In another example, the timing of the travel may be challenging (very early or very late travel times). In another example, after a long drive, another drive may follow within only a short period of recovery time in between. The wearable application 250 may cause the user device 106 to provide instructions to the user 102, for example, with respect to the amount of sleep needed (for example, "you have a long ride tomorrow, go to bed by 10:00 pm at the latest and eat a good breakfast in the morning" or "you have a flight tomorrow, go to bed by 10:00 pm at the latest and eat a good breakfast in the morning") or with respect to eating and/or the number of breaks during a drive ("you have a long drive today after a busy day, take multiple breaks during the drive" or "you have another long drive coming soon, eat and rest before the drive"). Further, sleep stages, sleep scores and sleep states associated with the user 102 have been discussed earlier with respect to FIG. 1. This sleep information may be used when determining and providing physiological state-related insights to the user.

For example, the wearable application 250 may take into account the comparison result between the current user alertness data and the reference user alertness data, when determining what instructions or insights to provide to the user. For example, if the comparison between current user alertness data and the reference user alertness data indicates a greater, first difference than a smaller, second difference, the first difference may cause provision of a longer sleep instruction and the second difference. In other words, the amount of sleep needed may be dependent on the comparison result.

In some embodiments, the traveling event may be a current traveling event. For example, the physiological data received from the wearable device 104 may comprise acceleration sensor data. The wearable application 250 may detect the current traveling event based at least in part on the acceleration sensor data. For example, the acceleration sensor data may provide an indication that the user 102 is driving a car and that the user's 102 hand or hands perform a rotative motion when the user 106 rotates the steering wheel of the car. As the wearable device 104, for example, a ring, is worn by the user 102, the ring moves when the user moves his hand including the ring. At the same time, as the actual movement of the user's hand when rotating the steering wheel is limited, the movement causes specific and repetitive signal components to the acceleration sensor data. When the acceleration sensor data is analyzed, these signal components can be identified and it may be determined that the user 102 is currently driving a car. In some embodiments, the determination may use reference acceleration sensor data for identifying that the user is driving a car. The reference acceleration data may refer to data stored in the user device 106 and accessible by the wearable application 250. The reference acceleration data may identify, for example, signal waveforms associated with hand movements when the steering wheel is rotated. These waveforms can then be compared to the acceleration data obtained from the wearable device 102.

In some embodiments, the user device 106 may establish an active local communication link (for example, a wireless Bluetooth link) between the user device 106 and the vehicle 302, and the traveling event may be detected based at least in part on the existence of the active local communication link. When the wearable application 250 identifies that an active local communication link has been established between the user device 106 and the vehicle 302, for example, due to the fact that the user device 106 has been detected by the vehicle 302 or vice versa, the existence of the active local communication link between the user device 106 and the vehicle 302 provides an indication that the user has started a traveling event. The detection of the traveling event may also mean that the process of identifying the triggering condition may be initiated. In other words, as there was no indication of the traveling event earlier and no future traveling events are known, the process of identifying the trigger condition may in one example be started when traveling event has been detected.

In some embodiments, the user device 106 may receive satellite positioning data from the user device 106, and the traveling event may be detected based at least in part on the satellite positioning data received from the user device 106. For example, if the user's 102 speed determined based on the satellite positioning data exceeds a predetermined threshold or that the user's 106 location changes constantly and the acceleration sensor data received from the wearable device 104 indicates that the user 102 is driving a car, it can be determined that the user 106 is actually in the car driving it and that there is a current traveling event. The acceleration data may indicate, for example, a repeating movement of a hand of the user 106 indicating that the user 106 is touching the steering wheel and rotating it during driving. In some embodiments, the user device 106 may store reference acceleration data accessible by the wearable application 250. The reference acceleration data may identify, for example, signal waveforms associated with hand movements when the steering wheel is rotated. These waveforms can then be compared to the acceleration data obtained from the wearable device 102. When there is a match or a sufficiently close match, it can be determined that the user 102 is driving the car.

In some embodiments, in response to detecting the traveling event, an instruction to apply a predefined rate for transmitting the physiological data may be transmitted to the wearable device 104. The wearable application 250 may instruct the wearable device 104 to transmit the physiological data more frequently, when the traveling event has been detected. This ensures that during the traveling event the physiological data is sent from the at least one wearable device 104 frequently to monitor the user 102. When the physiological data is received more frequently, possible changes with the user 102 or the user's 102 behavior reflected on the physiological data may be identified quickly and necessary actions may be performed quickly. As the current alertness data of the user is determined based on more recent physiological data, the trigger condition may be identified as soon as detecting the change in the current user alertness data. When it is detected that the traveling event is finished, the wearable application 250 may instruct the wearable device 104 to transmit the physiological data again at a normal rate, for example, in order to save the battery of the wearable device 104.

In some embodiments, causing the user device 106 to provide the physiological state-related insight associated with the user 102 may comprise transmitting the physiological state-related insight to the vehicle 302 via the active local communication link between the user device 106 and the vehicle 302. This enables a solution in which the vehicle may use the physiological state-related insight associated with the user received from the user device 106 at least in part when deciding whether to alert the user 102 or not. For example, the physiological state-related insight associated with the user 102 may comprise one or more predefined messages associated with the identified trigger condition for providing a physiological state-related insight associated with the user relating to a traveling event involving a vehicle. For example, there may be an agreed messaging structure between the wearable application 250 and the vehicle 302 or a vehicle system. The messaging structure may define messages and information that can be sent between the wearable application 250 and the vehicle 302. For example, simple numerical or binary values may be transmitted from the wearable application 250 to the vehicle 302, and each numerical or binary value has a predetermined meaning. For example, a bit value '0001' may indicate that the physiological state-related insight associated with the user 102 means "have a coffee break", a bit value '0010' may indicate that the physiological state-related insight associated with the user 102 means "stop immediately for a longer break", a bit value '0011' may indicate that the physiological state-related insight associated with the user 102 means "reduce speed" etc. As another example, a specific bit value may indicate to the vehicle 302 that the user is too fatigued to safely operate the vehicle 302. In response to this indication, the vehicle 302 may be configured not to start the vehicle 302 as the user is not capable for driving safely. It is evident that these are only examples of possible physiological state-related insights and that any other insight relating to the user alertness data may be applied. As the wearable device 104 provides physiological data about the user 102 based on which the current user alertness data may be determined, it is possible to estimate or recognize the user's physical and/or mental load before the traveling event or during the traveling event. For example, in response to receiving a physiological state-related insight from the user device 106, the driver monitoring system may reduce the temperature in the vehicle in order to keep the user 102 more alert, alert the user 102 to take a break and/or automatically reduce the speed of the vehicle 102 as the physiological state-related insight indicated reduced alertness level relating to the user 106. In a further example, depending on the physiological state-related insight received from the wearable application 250, the vehicle 302 may, for example, apply to the vehicle different minimum distance limits to a vehicle in front of the vehicle 302.

In some embodiments, the wearable application 250 may offer a secure application programming interface (API) via the user device 106 to the vehicle 302. This allows the vehicle's 302 driver monitoring system to receive additional information from the user device 106 in a secure way via a secure communication connection for its decision making.

In some embodiments, the wearable application 250 may cause a graphical user interface of the user device 106 to display the physiological state-related insight associated with the user. The GUI may, for example, display a message or a notification to the user, for example, "take a short break", "reduce speed", "keep more distance to the car ahead of you", "have a cup of coffee" etc. As another example, if the traveling event is a future traveling event (for example, happening tomorrow), the GUI may be configured to display a notification to the user 102, for example, so that the user 102 should sleep enough during the following night and/or eat correctly at a correct time. For example, the notification may instruct the user to "go to bed at 09:00 pm at the latest", when the traveling event starts 07:00 am in the following morning. As another example, the notification may instruct the user in the evening to "eat a full breakfast in the morning", when the traveling event starts 09:00 am in the following morning. As another example, the physiological data obtained from the wearable device 104 may comprise glucose level measurements, and the wearable application 250 may monitor the glucose level of the user based on the measurement. Based on the monitored glucose level, the GUI may be configured to let the user know that their blood sugar level is low/high and instruct the user to eat before the start of a travel.

In some embodiments, the user device 106 may be configured to provide at least one of an auditory alert, a haptic alert and a visual alert associated with the physiological state-related insight. For example, the user device 106 may provide an auditory message to the user 102 via a speaker, for example, "take a short break", "reduce speed", "keep more distance to the car ahead of you", "have a cup of coffee". In another example, the auditory alert may be a predetermined audio signal provided via the speaker, for example, a buzzer signal to alert the user 102. The audio signal may also indicate that a more detailed message is provided on the GUI. In another example, the user device 106 may provide a predetermined haptic pattern to alert the user 102. In another example, the wearable application 250 may cause the user device 106 to instruct the wearable device 104 to provide a haptic alert to indicate that a more detailed message is provided on the GUI.

In some embodiments, when causing the user device 106 to provide the physiological state-related insight associated with the user 102, the wearable application 250 may transmit the physiological state-related insight to a network entity, for example, to a calling service. For example, in response to the transmitted physiological state-related insight, the calling service may establish a call to the user device 106 to inform the user about the user's 102 state. The call may, for example, inform the user that "you are too tired to continue your drive, stop immediately". The calling service may be used, for example, in situations in which the user's attention cannot be obtained in any other way via the GUI, auditory alerts, haptic alerts and/or visual alerts. In other words, the calling service may be used as a "last resort" to get the user's 102 attention.

In some embodiments, the wearable application 250 may receive vehicle data associated with the user 102 from the vehicle 302. The vehicle data associated with the user comprises traveling user behavior data collected during the traveling event. The trigger condition may be identified based at least in part on the vehicle data. For example, there may be an agreed messaging structure between the wearable application 250 and the vehicle 302 or a vehicle system. The messaging structure may define messages or information that can be sent between the wearable application 250 and the vehicle 302. For example, simple numerical or binary values may be transmitted from the vehicle 302 to the wearable application 250. A driver monitoring system of the vehicle 302 may monitor the user and the user's actions and behavior using, for example, various sensors and driving data provided by the vehicle 302 (for example, speed, driving periods, lane assist data, steering wheel handling data, brake data etc.). Each information may then be transmitted to the wearable application 250, for example, as coded messages in the messaging structure. For example, a specific binary field may identify steering wheel handling data in a coded form, for example, relating to the number of abrupt steering wheel actions the user has performed with the last X minutes, number of abrupt brake occasions the user has performed within the last X minutes etc. The vehicle 302 may send vehicle data to the wearable application 250, for example, via the secure API. As the wearable application 250 knows the current user alertness data based on the physiological data received from the wearable device 104, the vehicle data received from the vehicle 302 may be used to complement the current user alertness data. For example, the vehicle data received from the vehicle 302 may provide an indication that the user is showing symptoms of tiredness based on the data collected by the vehicle. For example, the user may be performing too many abrupt (corrective) steering wheel actions within a specified time while at the time the lane assist data indicates that the user has difficulties in staying on the lane. When the vehicle data received from the vehicle 302 is combined with the current user alertness data determined by the wearable application 250, the combination may trigger the trigger condition for providing the physiological state-related insight associated with the user relating to the traveling event involving the vehicle 302. Thus, also the data received from the vehicle 302 may be used in identifying the trigger condition. For example, although the current user alertness data alone may not yet cause identification of the trigger condition, the current user alertness data together with the vehicle data may cause the identification. Based on the identification, the wearable application 250 may prompt the user, for example, to stop the vehicle 302 and take a break.

In some embodiments, the wearable application 250 may receive weather data associated with the traveling event. It may be determined, based on the weather data associated with the traveling event, that the weather data associated with the traveling event has an effect on the traveling event. For example, the user may have just started the traveling event with a car. The weather data may, for example, indicate that a storm is approaching and it is about to coincide with the user's driving route. The identification of the trigger condition may then comprise identifying the trigger condition based at least in part on the weather data. For example, if the current user alertness data indicates that the user is already tired, the wearable application 250 may also use the weather data when deciding about the physiological state-related insight associated with the user. The provided physiological state-related insight may, for example, instruct the user to change his route due to the storm or to take a longer break so that the storm passes the user during the break or to instruct the user 102 to take more breaks during the traveling event than usual. Alternatively, if the user has not yet started the traveling event and the storm is approaching, the wearable application 250 may ask the user 102, for example, to delay the start of the traveling event or start the traveling event earlier.

In some embodiments, the wearable application 250 may receive satellite positioning data associated with the traveling event from the user device 106. For example, it may be identified that the traveling event relates to a route that the user has not driven before, i.e. to an unexperienced route. The wearable application 250 may have access to route data that includes routes that the user has travelled earlier. This information can be used to determine when the user travels a route that has not been travelled before or has been travelled rarely. Thus, it can be determined that the traveling event relates to an unexperienced route for the user, and this can be taken into account when identifying the trigger condition. The wearable application 250 may, for example, ask the user to drive slower and/or take breaks during the traveling event more than usual.

In some embodiments, the wearable application 250 may receive route schedule data associated with the traveling event. The route schedule data may, for example, identify the time length of the traveling event and a starting time of the traveling event. For example, the wearable application 250 may detect, based on information obtained from a map application or a navigation application that the user 102 starts or intends to start a long and/or a long lasting traveling event, for example, with a car. This information can be taken into account when identifying the trigger condition. For example, the current user alertness data may indicate that the user is tired. As the user 102 now starts or intends to start a long and/or a long lasting traveling event, this can be taken into account what physiological state-related insight will be provided to the user. For example, a longer and/or long lasting car driving event may cause provision of both resting and eating instructions to the user during the car driving event, while a shorter car driving event may cause provision of only resting instructions to the user during the car driving event.

In some embodiments, multiple vehicles may be involved in a single traveling event. For example, the user 102 may start or may have started a traveling event that first involves a flight and then a subsequent drive with a car to a final destination. In the case of multiple vehicles relating to a single traveling event, the physiological state-related insight associated with the user may then take into account the fact that there are multiple vehicles associated with one traveling event. For example, the provided physiological state-related insight associated with the user may be different when the user first takes a six hour flight followed by a five hour drive than just for a five hour drive without flying first. For example, the user's behavior before and/or during the flight (for example, whether or not the user slept during the flight) may have an effect on the provided physiological state-related insight associated with the user.

Figure 4:
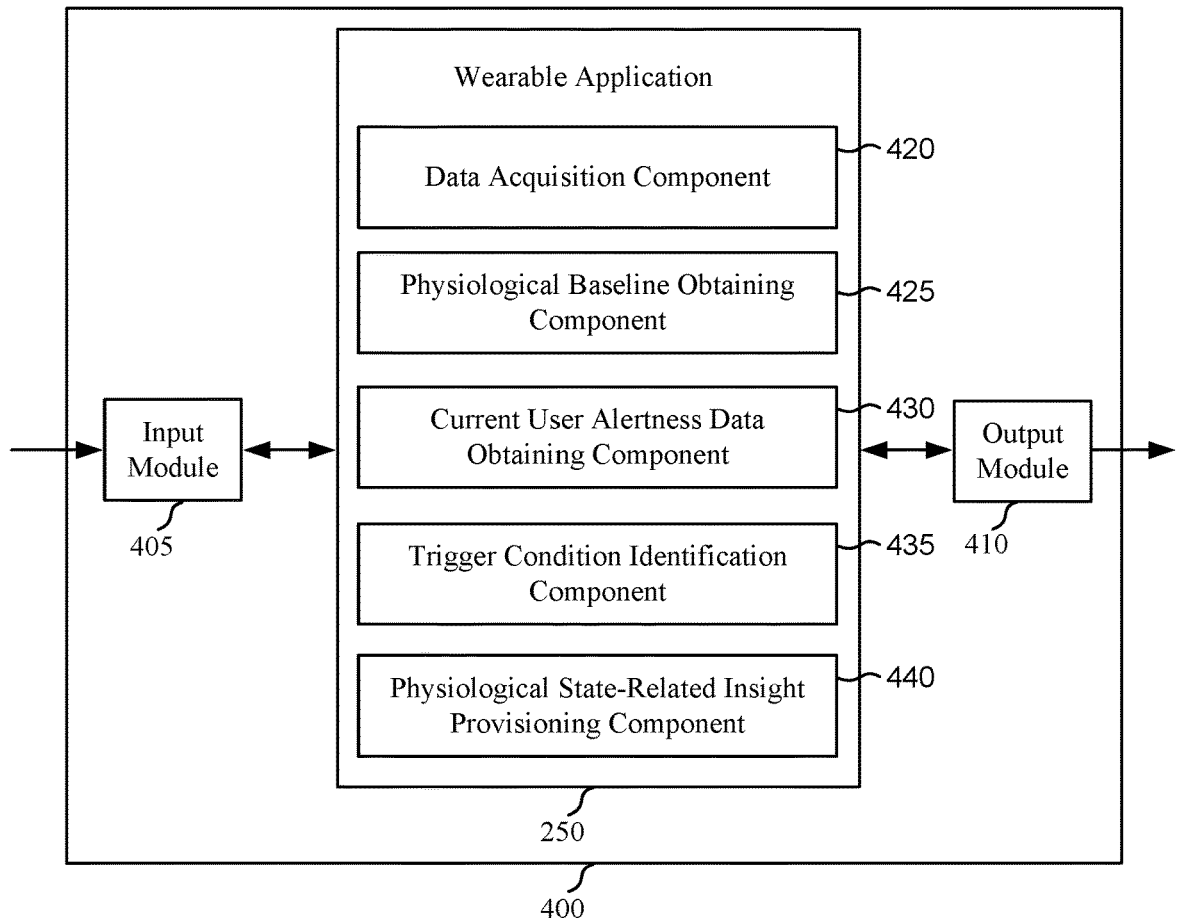
FIG. 4 shows a block diagram of an apparatus that supports techniques for providing physiological state-related insights associated with a user, in accordance with aspects of the present disclosure.

FIG. 4 shows a block diagram of a device 400 that supports techniques for providing physiological state-related insights associated with a user, in accordance with aspects of the present disclosure. The device 400 may include an input module 405, an output module 410, and a wearable application 250. The device 400 may also include a processor. Each of these components may be in communication with one another (e.g., via one or more buses).

The input module 405 may provide a means for receiving information such as packets, user data, control information, or any combination thereof associated with various information channels (e.g., control channels, data channels, information channels related to illness detection techniques). Information may be passed on to other components of the device 400. The input module 405 may utilize a single antenna or a set of multiple antennas.

The output module 410 may provide a means for transmitting signals generated by other components of the device 400. For example, the output module 410 may transmit information such as packets, user data, control information, or any combination thereof associated with various information channels (e.g., control channels, data channels, information channels related to illness detection techniques). In some examples, the output module 410 may be co-located with the input module 405 in a transceiver module. The output module 410 may utilize a single antenna or a set of multiple antennas.

For example, the wearable application 250 may include a data acquisition component 420, a physiological baseline obtaining component 425, a current user alertness data obtaining component 430, a trigger condition identification component 435 and a physiological state-related insight provisioning component 440, or any combination thereof. In some examples, the wearable application 250, or various components thereof, may be configured to perform various operations (e.g., receiving, monitoring, transmitting) using or otherwise in cooperation with the input module 405, the output module 410, or both. For example, the wearable application 250 may receive information from the input module 405, send information to the output module 410, or be integrated in combination with the input module 405, the output module 410, or both to receive information, transmit information, or perform various other operations as described herein.

The data acquisition component 420 may be configured as or otherwise support a means for receiving baseline physiological data associated with a user from at least one wearable device. The physiological baseline obtaining component 425 may be configured as or otherwise support a means for obtaining a physiological baseline associated with the user based at least in part on the baseline physiological data associated with the user, the physiological baseline providing reference user alertness data. The data acquisition component 420 may be configured as or otherwise support a means for receiving additional physiological data associated with the user from the at least one wearable device. The current user alertness data obtaining component 430 may be configured as or otherwise support a means for obtaining current user alertness data based at least in part on the additional physiological data associated with the user. The trigger condition identification component 435 may be configured as or otherwise support a means for identifying a trigger condition for providing a physiological state-related insight associated with the user relating to a traveling event involving a vehicle based at least in part on a comparison between the current user alertness data and the reference user alertness data. The physiological state-related insight provisioning component 440 may be configured as or otherwise support a means for causing a user device to provide the physiological state-related insight associated with the user.

Figure 5:
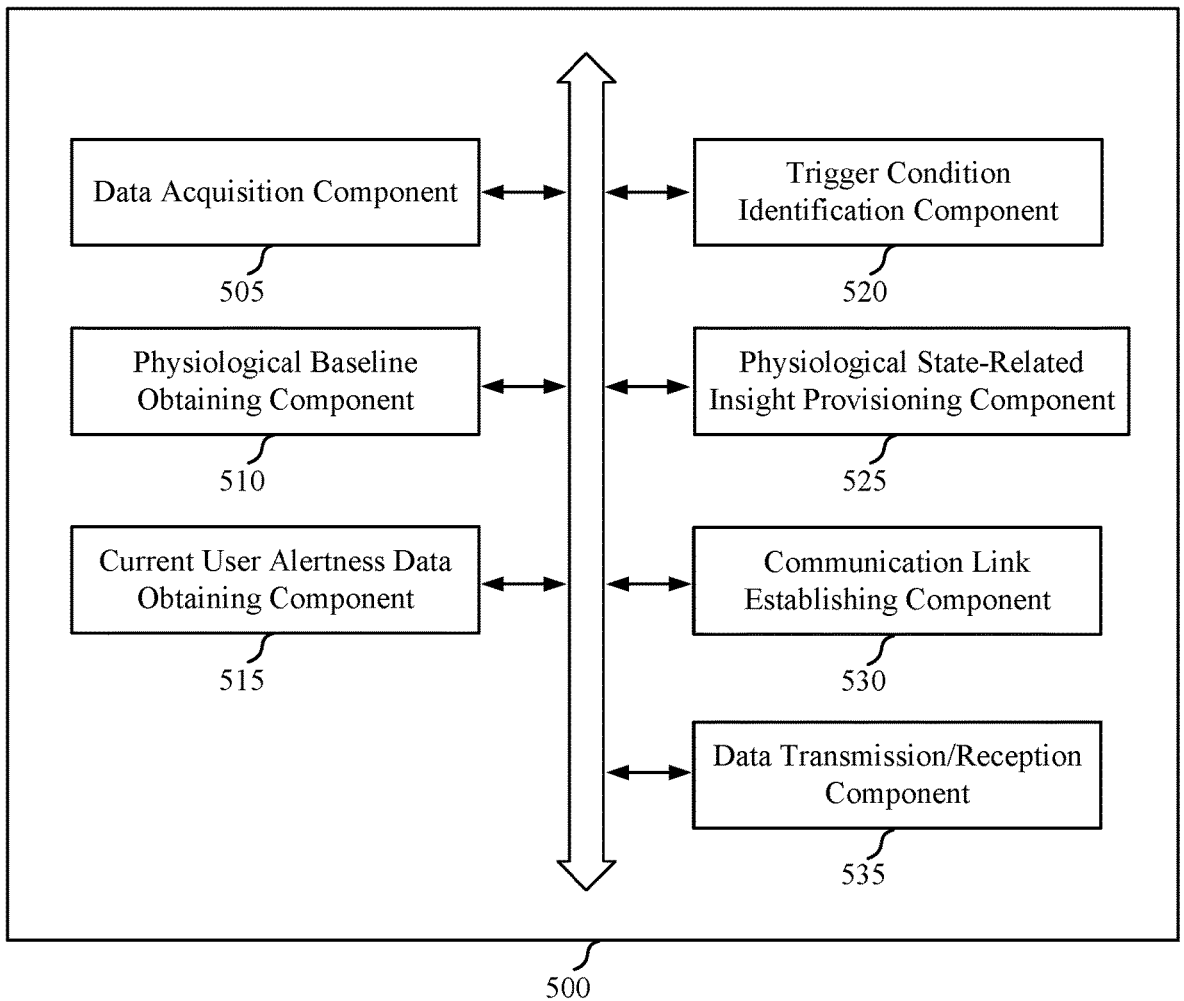
FIG. 5 shows a block diagram of a wearable application that supports techniques for providing physiological state-related insights associated with a user, in accordance with aspects of the present disclosure.

FIG. 5 shows a block diagram of a wearable application 500 that supports techniques for providing physiological state-related insights associated with a user, in accordance with aspects of the present disclosure. The wearable application 500 may be an example of aspects of a wearable application or a wearable application 250, or both, as described herein. The wearable application 500, or various components thereof, may be an example of means for performing various aspects of techniques for providing physiological state-related insights associated with a user as described herein. For example, the wearable application 500 may include a data acquisition component 505, a physiological baseline obtaining component 510, a current user alertness data obtaining component 515, a trigger condition identification component 520, a physiological state-related insight provisioning component 525, a communication link establishing component 530, a data transmission component 535, or any combination thereof. Each of these components may communicate, directly or indirectly, with one another (e.g., via one or more buses).

The data acquisition component 505 may be configured as or otherwise support a means for receiving baseline physiological data associated with a user from at least one wearable device. The physiological baseline obtaining component 510 may be configured as or otherwise support a means for obtaining a physiological baseline associated with the user based at least in part on the baseline physiological data associated with the user, the physiological baseline providing reference user alertness data. The data acquisition component 505 may be configured as or otherwise support a means for receiving additional physiological data associated with the user from the at least one wearable device. The current user alertness data obtaining component 515 may be configured as or otherwise support a means for obtaining current user alertness data based at least in part on the additional physiological data associated with the user. The trigger condition identification component 520 may be configured as or otherwise support a means for identifying a trigger condition for providing a physiological state-related insight associated with the user relating to a traveling event involving a vehicle based at least in part on a comparison between the current user alertness data and the reference user alertness data. The physiological state-related insight provisioning component 525 may be configured as or otherwise support a means for causing a user device to provide the physiological state-related insight associated with the user. The communication link establishing component 530 may be configured as or otherwise support a means for establishing a local communication link between a user device and the vehicle. The data transmission/reception component 535 may be configured as or otherwise support a means for transmitting the physiological state-related insights to the vehicle via the local communication link between the user device and the vehicle and/or receiving vehicle data associated with the user from the vehicle.

In some examples, the trigger condition identification component 520 may be configured as or otherwise support a means for identifying the trigger condition when the current user alertness data differs from the reference user alertness data by a predetermined threshold amount.

In some examples, the traveling event is a future traveling event.

In some examples, the traveling event is a current traveling event.

In some examples, the physiological data received from the wearable device 104 comprises acceleration sensor data, and the trigger condition identification component 520 may be configured as or otherwise support a means for identifying that the user is driving the vehicle based at least in part on a comparison between the acceleration sensor data and reference acceleration sensor data and detecting the traveling event based at least in part on the comparison.

In some examples, the physiological state-related insight provisioning component 525 may be configured as or otherwise support a means for establishing an active local communication link between the user device and the vehicle, and the trigger condition identification component 520 may be configured as or otherwise support a means for detecting the traveling event based at least in part on the existence of the active local communication link between the user device and the vehicle.

In some examples, the data acquisition component 505 may be configured as or otherwise support a means for receiving satellite positioning data from the user device. In some examples, the trigger condition identification component 520 may be configured as or otherwise support a means for detecting the traveling event based at least in part on the satellite positioning data from the user device.

In some examples, the data transmission/reception component 525 may be configured as or otherwise support a means for transmitting, in response to detecting the traveling event, to the at least one wearable device an instruction to apply a predefined rate for transmitting the physiological data.

In some examples, the physiological state-related insight provisioning component 525 may be configured as or otherwise support a means for causing a graphical user interface of the user device to display the physiological state-related insight.

In some examples, the physiological state-related insight provisioning component 525 may be configured as or otherwise support a means for causing the user device to provide at least one of an auditory alert, a haptic alert and a visual alert associated with the physiological state-related insight.

In some examples, the data transmission/reception component 535 may be configured as or otherwise support a means for receiving vehicle data associated with the user from the vehicle, wherein the vehicle data associated with the user comprises user behavior data collected during the traveling event. In some examples, the trigger condition identification component 520 may be configured as or otherwise support a means for identifying the trigger condition comprises identifying the trigger condition based at least in part on the vehicle data associated with the user.

In some examples, data transmission/reception component 535 may be configured as or otherwise support a means for receiving weather data associated with the traveling event. In some examples, the trigger condition identification component 520 may be configured as or otherwise support a means for determining, based on the weather data associated with the traveling event, that the weather data associated with the traveling event has an effect on the traveling event, and for identifying the trigger condition based at least in part on the weather data.

In some examples, data transmission/reception component 535 may be configured as or otherwise support a means for receiving calendar data associated with the traveling event. In some examples, the trigger condition identification component 520 may be configured as or otherwise support a means for determining, based on calendar data associated with the traveling event, that the traveling event is a future traveling event, and for identifying the trigger condition comprises identifying the trigger condition based at least in part on the determination.

In some examples, data transmission/reception component 535 may be configured as or otherwise support a means for receiving satellite positioning data associated with the traveling event from the user device. In some examples, the trigger condition identification component 520 may be configured as or otherwise support a means for determining, based on the satellite positioning data associated with the traveling event, that the traveling event relates to an unexperienced route for the user, and for identifying the trigger condition based at least in part on the determination.

In some examples, data transmission/reception component 535 may be configured as or otherwise support a means for receiving route schedule data associated with the traveling event. In some examples, the trigger condition identification component 520 may be configured as or otherwise support a means for identifying the trigger condition based at least in part on the route schedule data.

Figure 6:
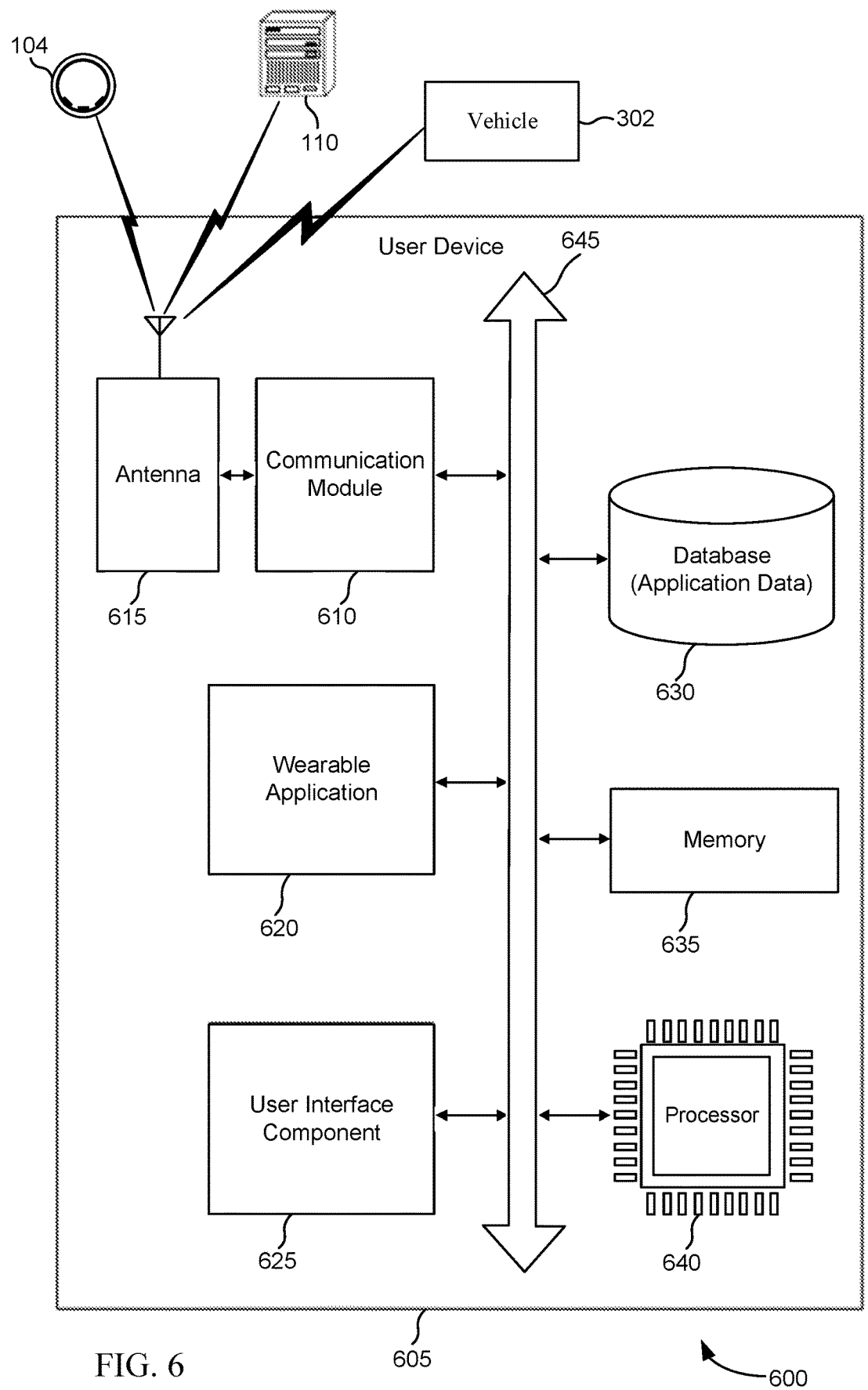
FIG. 6 shows a diagram of a system including a device that supports techniques for providing physiological state-related insights associated with a user, in accordance with aspects of the present disclosure.

FIG. 6 shows a diagram of a system 600 including a device 605 that supports techniques for providing physiological state-related insights associated with a user, in accordance with aspects of the present disclosure. The device 605 may be an example of or include the components of a device 400 as described herein. The device 605 may include an example of a user device 106, as described previously herein. The device 605 may include components for bi-directional communications including components for transmitting and receiving communications with a wearable device 104 and a server 110, such as a wearable application 620, a communication module 610, an antenna 615, a user interface component 625, a database (application data) 630, a memory 635, and a processor 640. These components may be in electronic communication or otherwise coupled (e.g., operatively, communicatively, functionally, electronically, electrically) via one or more buses (e.g., a bus 645).

The communication module 610 may manage input and output signals for the device 605 via the antenna 615. The communication module 610 may include an example of the communication module 220-*b* of the user device 106 shown and described in FIG. 2. In this regard, the communication module 610 may manage communications with the ring 104 and the server 110, as illustrated in FIG. 2. The communication module 610 may also manage peripherals not integrated into the device 605. In some cases, the communication module 610 may represent a physical connection or port to an external peripheral. In some cases, the communication module 610 may utilize an operating system such as iOS®, ANDROID®, MS-DOS®, MS-WINDOWS®, OS/2®, UNIX®, LINUX®, or another known operating system. In other cases, the communication module 610 may represent or interact with a wearable device (e.g., ring 104), modem, a keyboard, a mouse, a touchscreen, or a similar device. In some cases, the communication module 610 may be implemented as part of the processor 640. In some examples, a user may interact with the device 605 via the communication module 610, user interface component 625, or via hardware components controlled by the communication module 610.

In some cases, the device 605 may include a single antenna 615. However, in some other cases, the device 605 may have more than one antenna 615, which may be capable of concurrently transmitting or receiving multiple wireless transmissions. The communication module 610 may communicate bi-directionally, via the one or more antennas 615, wired, or wireless links as described herein. For example, the communication module 610 may represent a wireless transceiver and may communicate bi-directionally with another wireless transceiver. The communication module 610 may also include a modem to modulate the packets, to provide the modulated packets to one or more antennas 615 for transmission, and to demodulate packets received from the one or more antennas 615.

The user interface component 625 may manage data storage and processing in a database 630. In some cases, a user may interact with the user interface component 625. In other cases, the user interface component 625 may operate automatically without user interaction. The database 630 may be an example of a single database, a distributed database, multiple distributed databases, a data store, a data lake, or an emergency backup database.

The memory 635 may include RAM and ROM. The memory 635 may store computer-readable, computer-executable software including instructions that, when executed, cause the processor 640 to perform various functions described herein. In some cases, the memory 635 may contain, among other things, a BIOS which may control basic hardware or software operation such as the interaction with peripheral components or devices.

The processor 640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 640 may be configured to operate a memory array using a memory controller. In other cases, a memory controller may be integrated into the processor 640. The processor 640 may be configured to execute computer-readable instructions stored in a memory 635 to perform various functions (e.g., functions or tasks supporting a method and system for sleep staging algorithms).

For example, the wearable application 620 may be configured as or otherwise support a means for receiving baseline physiological data associated with a user from at least one wearable device. The wearable application 620 may be configured as or otherwise support a means for obtaining a physiological baseline associated with the user based at least in part on the baseline physiological data associated with the user, the physiological baseline providing reference user alertness data. The wearable application 620 may be configured as or otherwise support a means for receiving additional physiological data associated with the user from the at least one wearable device. The wearable application 620 may be configured as or otherwise support a means for obtaining current user alertness data based at least in part on the additional physiological data associated with the user. The wearable application 620 may be configured as or otherwise support a means for identifying a trigger condition for providing a physiological state-related insight associated with the user relating to a traveling event involving a vehicle based at least in part on a comparison between the current user alertness data and the reference user alertness data. The wearable application 620 may be configured as or otherwise support a means for causing a user device to provide the physiological state-related insight associated with the user.

The wearable application 620 may include an application (e.g., "app"), program, software, or other component which is configured to facilitate communications with a ring 104, server 110, other user devices 106, and the like. For example, the wearable application 620 may include an application executable on a user device 106 which is configured to receive data (e.g., physiological data) from a ring 104, perform processing operations on the received data, transmit and receive data with the servers 110, and cause presentation of data to a user 102.

Figure 7:
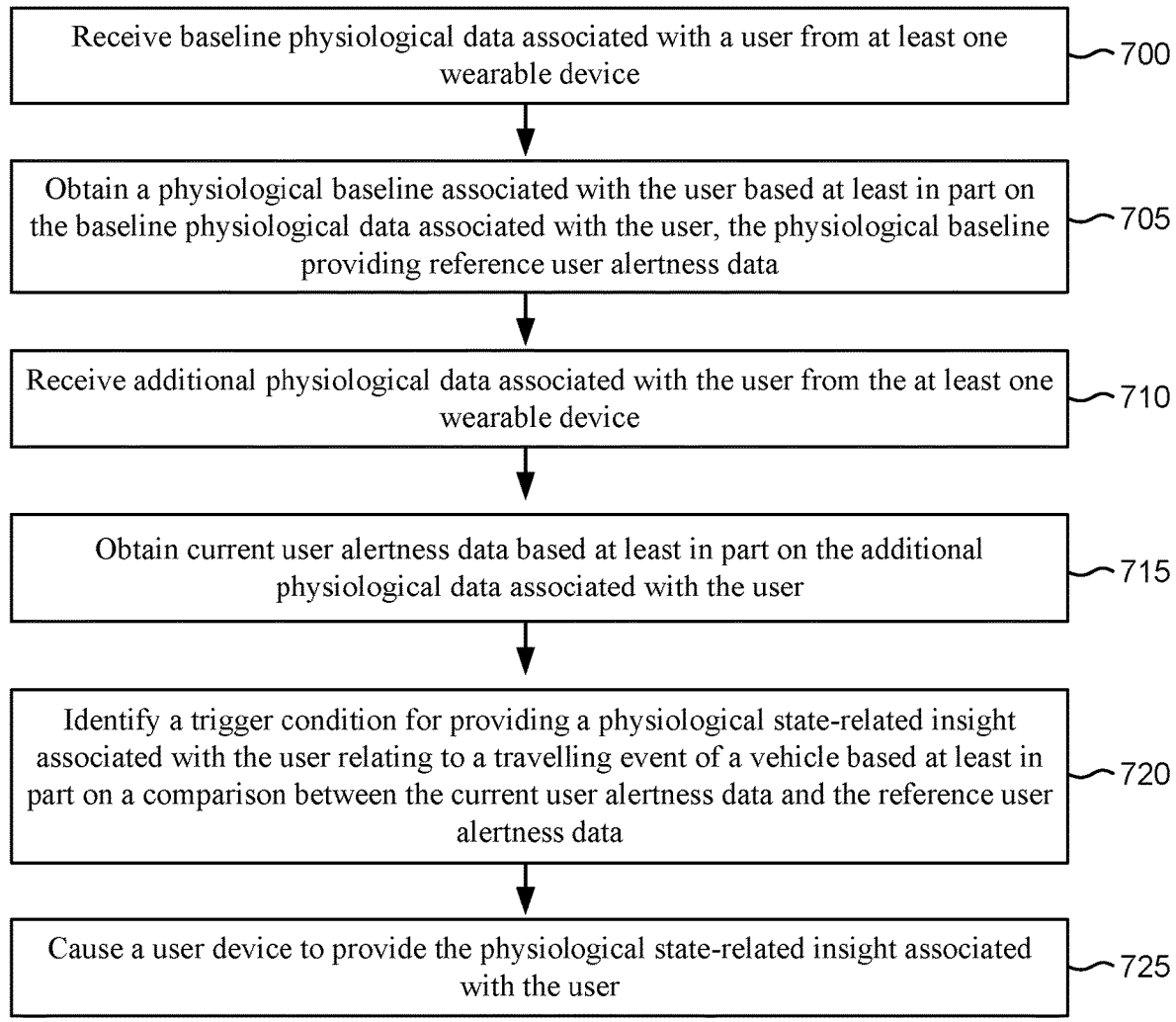
FIG. 7 shows a flowchart illustrating a method that support techniques for providing physiological state-related insights associated with a user, in accordance with aspects of the present disclosure.

FIG. 7 shows a flowchart illustrating a method that supports techniques for providing physiological state-related insights associated with a user, in accordance with aspects of the present disclosure. The operations of the method 700 may be implemented by a user device or its components as described herein. For example, the operations of the method may be performed by a user device as described with reference to FIGS. 1 through 6. In some examples, a user device may execute a set of instructions to control the functional elements of the user device to perform the described functions. Additionally, or alternatively, the user device may perform aspects of the described functions using special-purpose hardware.

At 700, the method may include receiving baseline physiological data associated with a user from at least one wearable device. The operations of 700 may be performed in accordance with examples as disclosed herein. In some examples, aspects of the operations of 700 may be performed by a data acquisition component 420 as described with reference to FIG. 4.

At 705, the method may include obtaining a physiological baseline associated with the user based at least in part on the baseline physiological data associated with the user, the physiological baseline providing reference user alertness data. The operations of 705 may be performed in accordance with examples as disclosed herein. In some examples, aspects of the operations of 705 may be performed by a physiological baseline obtaining component 425 as described with reference to FIG. 4.

At 710, the method may include receiving additional physiological data associated with the user from the at least one wearable device. The operations of 710 may be performed in accordance with examples as disclosed herein. In some examples, aspects of the operations of 710 may be performed by a data acquisition component 420 as described with reference to FIG. 4.

At 715, the method may include obtaining current user alertness data based at least in part on the additional physiological data associated with the user. The operations of 715 may be performed in accordance with examples as disclosed herein. In some examples, aspects of the operations of 715 may be performed by a current user alertness data obtaining component 430 as described with reference to FIG. 4.

At 720, the method may include identifying a trigger condition for providing a physiological state-related insight associated with the user relating to a traveling event involving at least one vehicle based at least in part on a comparison between the current user alertness data and the reference user alertness data. The operations of 720 may be performed in accordance with examples as disclosed herein. In some examples, aspects of the operations of 720 may be performed by a trigger condition identification component 435 as described with reference to FIG. 4.

At 725, the method may include causing a user device to provide the physiological state-related insight associated with the user. The operations of 725 may be performed in accordance with examples as disclosed herein. In some examples, aspects of the operations of 725 may be performed by a physiological state-related insight provisioning component 440 as described with reference to FIG. 4.

It should be noted that the methods described above describe possible implementations, and that the operations and the steps may be rearranged or otherwise modified and that other implementations are possible. Furthermore, aspects from two or more of the methods may be combined.

Figure 8:
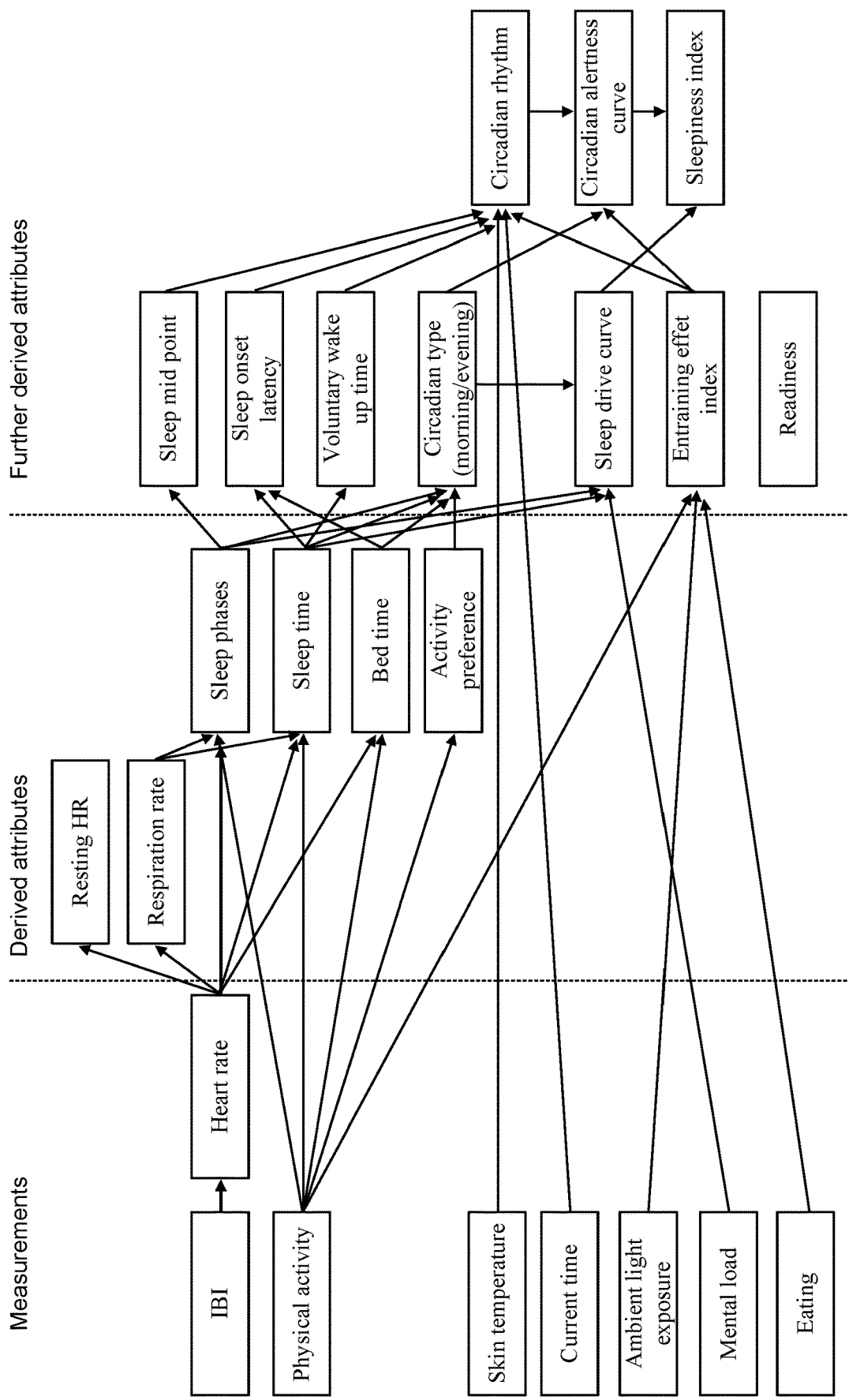
FIG. 8 shows a block diagram for illustrating relationships of measured and derived data attributes, in accordance with aspects of the present disclosure.

FIG. 8 shows a block diagram for illustrating relationships of measured and derived data attributes, in accordance with aspects of the present disclosure.

The measurements may comprise, for example, an interbeat interval (IBI), physical activity (intensity, duration, time), skin temperature, current time and timezone, ambient light exposure, mental load and eating. The derived attributes may comprise, for example, heart rate, resting heart rate, respiration rate, sleep phases, sleep time, bed time and activity preference. The even further derived attributes may comprise sleep mid point, sleep onset latency, voluntary wake up time, circadian type (morning/evening), sleep drive curve, entraining effect index, readiness, circadian rhythm, circadian alertness curve, and sleepiness index. In some embodiment, the alertness data may be obtained based at in part on one or more of these measurements and attributes.

A method is described. The method may include receiving baseline physiological data associated with a user from at least one wearable device; obtaining a physiological baseline associated with the user based at least in part on the baseline physiological data associated with the user, the physiological baseline providing reference user alertness data; receiving additional physiological data associated with the user from the at least one wearable device; obtaining current user alertness data based at least in part on the additional physiological data associated with the user; identifying a trigger condition for providing a physiological state-related insight associated with the user relating to a traveling event involving at least one vehicle based at least in part on a comparison between the current user alertness data and the reference user alertness data; and causing a user device to provide the physiological state-related insight associated with the user.

An apparatus is described. The apparatus may include a processor, memory coupled with the processor, and instructions stored in the memory. The instructions may be executable by the processor to cause the apparatus to receive baseline physiological data associated with a user from at least one wearable device; obtain a physiological baseline associated with the user based at least in part on the baseline physiological data associated with the user, the physiological baseline providing reference user alertness data; receive additional physiological data associated with the user from the at least one wearable device; obtain current user alertness data based at least in part on the additional physiological data associated with the user; identify a trigger condition for providing a physiological state-related insight associated with the user relating to a traveling event involving at least one vehicle based at least in part on a comparison between the current user alertness data and the reference user alertness data; and cause a user device to provide the physiological state-related insight associated with the user.

A non-transitory computer-readable medium storing code is described. The code may include instructions executable by a processor to receive baseline physiological data associated with a user from at least one wearable device; obtain a physiological baseline associated with the user based at least in part on the baseline physiological data associated with the user, the physiological baseline providing reference user alertness data; receive additional physiological data associated with the user from the at least one wearable device; obtain current user alertness data based at least in part on the additional physiological data associated with the user; identify a trigger condition for providing a physiological state-related insight associated with the user relating to a traveling event involving at least one vehicle based at least in part on a comparison between the current user alertness data and the reference user alertness data; and cause a user device to provide the physiological state-related insight associated with the user.

In some examples of the method, apparatuses, and non-transitory computer-readable medium described herein, identifying the trigger condition further comprises identifying the trigger condition when the current user alertness data differs from the reference user alertness data by a predetermined threshold amount.

In some examples of the method, apparatuses, and non-transitory computer-readable medium described herein, the traveling event is a future traveling event.

In some examples of the method, apparatuses, and non-transitory computer-readable medium described herein, the traveling event is a current traveling event.

In some examples of the method, apparatuses, and non-transitory computer-readable medium described herein, the additional physiological data comprises acceleration sensor data, further comprising identifying that the user is driving the at least one vehicle based at least in part on a comparison between the acceleration sensor data and reference acceleration sensor data; and detecting the traveling event based at least in part on the comparison.

Some examples of the method, apparatuses, and non-transitory computer-readable medium described herein may further include operations, features, means, or instructions for establishing an active local communication link between the user device and the at least one vehicle; and detecting the traveling event based at least in part on the existence of the active local communication link between the user device and the at least one vehicle.

Some examples of the method, apparatuses, and non-transitory computer-readable medium described herein may further include operations, features, means, or instructions for receiving satellite positioning data from the user device; and detecting the traveling event based at least in part on the satellite positioning data from the user device.

Some examples of the method, apparatuses, and non-transitory computer-readable medium described herein may further include operations, features, means, or instructions for transmitting, in response to detecting the traveling event, to the at least one wearable device an instruction to apply a predefined rate for transmitting the physiological data.

Some examples of the method, apparatuses, and non-transitory computer-readable medium described herein may further include operations, features, means, or instructions for transmitting the physiological state-related insight to the at least one vehicle via the active local communication link between the user device and the at least one vehicle.

Some examples of the method, apparatuses, and non-transitory computer-readable medium described herein may further include operations, features, means, or instructions for causing a graphical user interface of the user device to display the physiological state-related insight.

Some examples of the method, apparatuses, and non-transitory computer-readable medium described herein may further include operations, features, means, or instructions for causing the user device to provide at least one of an auditory alert, a haptic alert and a visual alert associated with the physiological state-related insight.

Some examples of the method, apparatuses, and non-transitory computer-readable medium described herein may further include operations, features, means, or instructions for receiving vehicle data associated with the user from the at least one vehicle, wherein the vehicle data associated with the user comprises user behavior data collected during the traveling event, and identifying the trigger condition based at least in part on the vehicle data associated with the user.

Some examples of the method, apparatuses, and non-transitory computer-readable medium described herein may further include operations, features, means, or instructions for receiving weather data associated with the traveling event; determining, based on the weather data associated with the traveling event, that the weather data associated with the traveling event has an effect on the traveling event; and identifying the trigger condition based at least in part on the weather data.

Some examples of the method, apparatuses, and non-transitory computer-readable medium described herein may further include operations, features, means, or instructions for receiving calendar data associated with the traveling event; determining, based on calendar data associated with the traveling event, that the traveling event is a future traveling event; and identifying the trigger condition based at least in part on the determination.

Some examples of the method, apparatuses, and non-transitory computer-readable medium described herein may further include operations, features, means, or instructions for receiving satellite positioning data associated with the traveling event from the user device; determining, based on the satellite positioning data associated with the traveling event, that the traveling event relates to an unexperienced route for the user; and identifying the trigger condition based at least in part on the determination.

Some examples of the method, apparatuses, and non-transitory computer-readable medium described herein may further include operations, features, means, or instructions for receiving route schedule data associated with the traveling event; and identifying the trigger condition based at least in part on the route schedule data The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for providing physiological state-related insights associated with a user, comprising:
   receiving baseline physiological data associated with a user from at least one wearable device;
   obtaining a physiological baseline associated with the user based at least in part on the baseline physiological data associated with the user, the physiological baseline providing reference user alertness data;
   establishing an active local communication link between a user device and at least one vehicle, the user device being a separate device from the at least one wearable device;
   detecting a current traveling event involving the at least one vehicle based at least in part on the existence of the active local communication link between the user device and the at least one vehicle;
   receiving additional physiological data associated with the user from the at least one wearable device;
   obtaining current user alertness data based at least in part on the additional physiological data associated with the user;
   identifying a trigger condition for providing a physiological state-related insight associated with the user relating to the traveling event based at least in part on a comparison between the current user alertness data and the reference user alertness data; and
   causing the user device to provide the physiological state-related insight associated with the user.

2. The method of claim 1, wherein the additional physiological data comprises acceleration sensor data, and the method further comprises:
   identifying that the user is driving the at least one vehicle based at least in part on a comparison between the acceleration sensor data and reference acceleration sensor data; and
   detecting the traveling event based at least in part on the comparison.

3. The method of claim 1, further comprising:
   receiving satellite positioning data from the user device; and
   detecting the traveling event based at least in part on the satellite positioning data from the user device.

4. The method of claim 1, further comprising:
   transmitting, in response to detecting the traveling event, to the at least one wearable device an instruction to apply a predefined rate for transmitting the physiological data.

5. The method of claim 1 wherein causing the user device to provide the physiological state-related insight associated with the user comprises transmitting the physiological state-related insight to the at least one vehicle via the active local communication link between the user device and the at least one vehicle.

6. The method of claim 1, wherein causing the user device to provide the physiological state-related insight associated with the user comprises causing a graphical user interface of the user device to display the physiological state-related insight.

7. The method of claim 1, wherein causing the user device to provide the physiological state-related insight associated with the user comprises causing the user device to provide at least one of an auditory alert, a haptic alert and a visual alert associated with the physiological state-related insight.

8. The method of claim 1, further comprising:
receiving vehicle data associated with the user from the at least one vehicle, wherein the vehicle data associated with the user comprises user behavior data collected during the traveling event,
wherein identifying the trigger condition comprises identifying the trigger condition based at least in part on the vehicle data associated with the user.

9. The method of claim 1, further comprising:
receiving weather data associated with the traveling event;
determining, based on the weather data associated with the traveling event, that the weather data associated with the traveling event has an effect on the traveling event; and
wherein identifying the trigger condition comprises identifying the trigger condition based at least in part on the weather data.

10. The method of claim 1, further comprising:
receiving satellite positioning data associated with the traveling event from the user device;
determining, based on the satellite positioning data associated with the traveling event, that the traveling event relates to an inexperienced route for the user; and
wherein identifying the trigger condition comprises identifying the trigger condition based at least in part on the determination.

11. The method of claim 1, further comprising:
receiving route schedule data associated with the traveling event;
wherein identifying the trigger condition comprises identifying the trigger condition based at least in part on the route schedule data.

12. The method of claim 1, wherein the trigger condition is identified when the current user alertness data differs from the reference user alertness data by a predetermined threshold amount.

13. An apparatus for providing physiological state-related insights associated with a user, the apparatus comprising:
a processor; and
a memory coupled with the processor; and
instructions stored in the memory and executable by the processor to cause the apparatus to:
receive baseline physiological data associated with a user from at least one wearable device;
obtain a physiological baseline associated with the user based at least in part on the baseline physiological data associated with the user, the physiological baseline providing reference user alertness data;
establish an active local communication link between a user device and at least one vehicle, the user device being a separate device from the at least one wearable device;
detect a current traveling event involving the at least one vehicle based at least in part on the existence of the active local communication link between the user device and the at least one vehicle;
receive additional physiological data associated with the user from the at least one wearable device;
obtain current user alertness data based at least in part on the additional physiological data associated with the user;
identify a trigger condition for providing a physiological state-related insight associated with the user relating to the traveling event based at least in part on a comparison between the current user alertness data and the reference user alertness data; and
cause the user device to provide the physiological state-related insight associated with the user.

14. A non-transitory computer-readable medium storing code, the code comprising instructions executable by a processor to:
receive baseline physiological data associated with a user from at least one wearable device;
obtain a physiological baseline associated with the user based at least in part on the baseline physiological data associated with the user, the physiological baseline providing reference user alertness data;
establish an active local communication link between a user device and at least one vehicle, the user device being a separate device from the at least one wearable device;
detect a current traveling event involving the at least one vehicle based at least in part on the existence of the active local communication link between the user device and the at least one vehicle;
receive additional physiological data associated with the user from the at least one wearable device;
obtain current user alertness data based at least in part on the additional physiological data associated with the user;
identify a trigger condition for providing a physiological state-related insight associated with the user relating to the traveling event based at least in part on a comparison between the current user alertness data and the reference user alertness data; and
cause the user device to provide the physiological state-related insight associated with the user.

* * * * *